US011183839B2

(12) United States Patent
Apte et al.

(10) Patent No.: US 11,183,839 B2
(45) Date of Patent: Nov. 23, 2021

(54) DC-DC POWER CONVERSION SYSTEM

(71) Applicant: IgrenEnergi, Inc., Mountain View, CA (US)

(72) Inventors: Jitendra Apte, Mumbai (IN); Alok Srivastava, Bangalore (IN); Hemanshu Bhatt, Mumbai (IN); Sunit Tyagi, Bangalore (IN); Dipti Kapadia, Mumbai (IN); Vinod Kumar Singh, Bangalore (IN); Bhawani Patnaik, Mumbai (IN); Leah Mathew, Bangalore (IN)

(73) Assignee: IGRENENERGI, INC., Mountain View, CA (US)

( * ) Notice: Subject to any disclaimer, the term of this patent is extended or adjusted under 35 U.S.C. 154(b) by 828 days.

(21) Appl. No.: 15/729,552

(22) Filed: Oct. 10, 2017

(65) Prior Publication Data

US 2018/0102646 A1 Apr. 12, 2018

(30) Foreign Application Priority Data

Oct. 10, 2016 (IN) .............................. 201621034605

(51) Int. Cl.
*H02J 1/00* (2006.01)
*H02J 1/14* (2006.01)
(Continued)

(52) U.S. Cl.
CPC ................ *H02J 1/14* (2013.01); *H02S 20/00* (2013.01); *H02S 20/10* (2014.12); *H02J 3/385* (2013.01); *H02J 3/387* (2013.01)

(58) Field of Classification Search
CPC .... H02J 1/14; H02J 3/385; H02J 3/387; H02J 3/381; H02J 2300/26; H02J 2300/30; H02S 20/10; H02S 20/00
(Continued)

(56) References Cited

U.S. PATENT DOCUMENTS

2012/0025618 A1* 2/2012 Erickson, Jr. ............. G05F 1/67
307/77
2012/0043923 A1* 2/2012 Ikriannikov .......... H02J 7/0014
320/103
(Continued)

OTHER PUBLICATIONS

ISA United States Patent Office, International Search Report and Written Opinion Issued in Application No. PCT/US2017/055985, dated Feb. 6, 2018, WIPO, 12 pages.
Patel, H. et al., "Maximum Power Point Tracking Scheme for PV Systems Operating Under Partially Shaded Conditions," IEEE Transactions on Industrial Electronics, vol. 55, No. 4, Apr. 2008, pp. 1689-1698.
(Continued)

*Primary Examiner* — Daniel Cavallari
*Assistant Examiner* — Dru Parries
(74) *Attorney, Agent, or Firm* — Alleman Hall Creasman & Tuttle LLP

(57) ABSTRACT

Disclosed examples relate to a power conversion system configured to provide a power output from an arrangement of direct current (DC) power sources. One example power conversion system includes multiple power sources PV(n), n=1 to x, connected in a series. For each power source PV(n) for n=1 to x−1, the power conversion system includes an intermediate bidirectional voltage converter VC(n) connected to a first terminal of the power source PV(n), a first terminal of power source PV(x), and a second terminal of power source PV(1). Each intermediate bidirectional voltage converter VC(n) includes a first switch operable in a pulsed mode to boost a power output by power source PV(n) and a second switch operable in a pulsed mode to reduce a power output by power source PV(n). The power conversion system also includes a balancer VC(x) connected to the first terminal of PV(x) and to a load.

9 Claims, 15 Drawing Sheets

(51) Int. Cl.
*H02S 20/10* (2014.01)
*H02S 20/00* (2014.01)
*H02J 3/38* (2006.01)

(58) Field of Classification Search
USPC .......................................................... 307/77
See application file for complete search history.

(56) References Cited

U.S. PATENT DOCUMENTS

| | | | |
|---|---|---|---|
| 2013/0033113 A1* | 2/2013 | Huang .................... | H02J 3/385 307/77 |
| 2013/0307341 A1 | 11/2013 | Shenoy et al. | |
| 2014/0368058 A1 | 12/2014 | Orr et al. | |
| 2015/0028679 A1 | 1/2015 | Francescutto et al. | |
| 2015/0137606 A1 | 5/2015 | Adest et al. | |
| 2016/0241079 A1 | 8/2016 | Adest et al. | |
| 2018/0234049 A1* | 8/2018 | Adest ..................... | H02J 1/102 |

OTHER PUBLICATIONS

Nimni, Y. et al., "A Returned Energy Architecture for Improved Photovoltaic Systems Efficiency," In Proceedings of the 2010 IEEE International Symposium on Circuits and Systems (ISCAS), May 30, 2010, Paris, France, 4 pages.

Shmilovitz, D. et al., "Distributed Maximum Power Point Tracking in Photovoltaic Systems—Emerging Architectures and Control Methods," Automatika, vol. 53, No. 2, Jan. 2012, pp. 142-155.

Shenoy, P. et al., "Differential Power Processing for Increased Energy Production and Reliability of Photovoltaic Systems," IEEE Transactions on Power Electronics, vol. 28, No. 6, Jun. 2013, pp. 2968-2979.

Grasso, A. et al., "Performance evaluation of a multistring photovoltaic module with distributed DC-DC converters," IET Renewable Power Generation, vol. 9, Issue 8, Nov. 12, 2015, 8 pages.

* cited by examiner

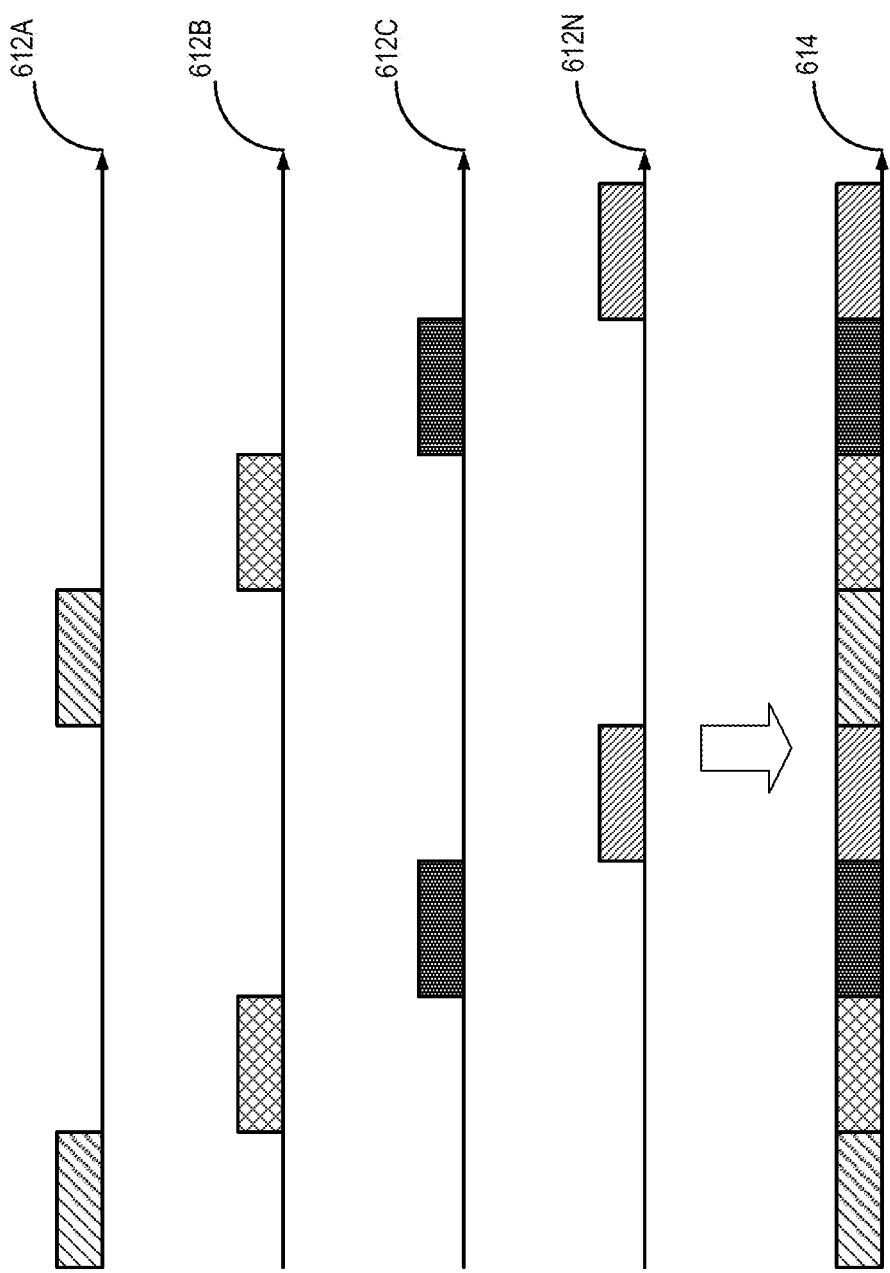

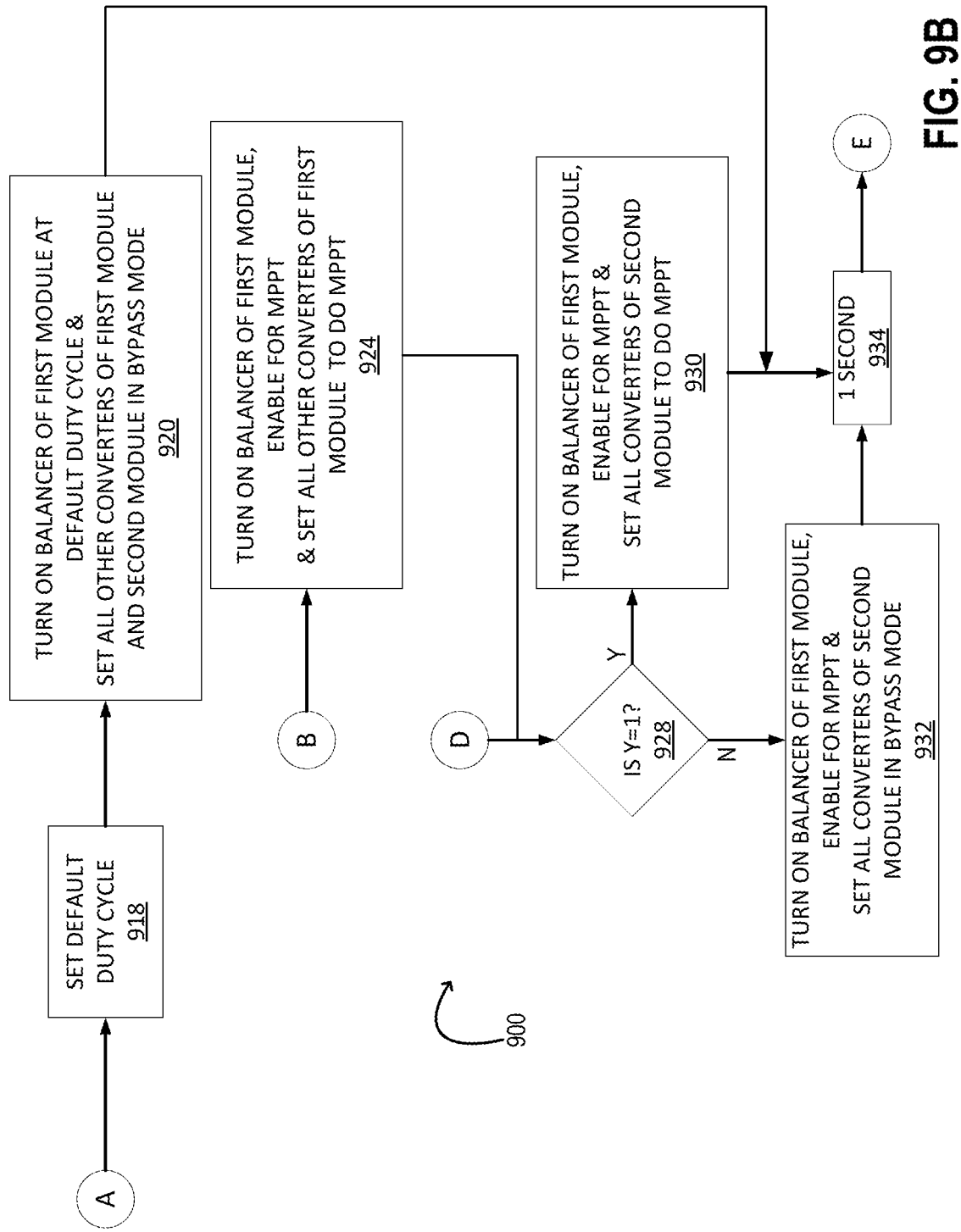

DC-DC POWER CONVERSION SYSTEM

CROSS REFERENCE TO RELATED APPLICATIONS

This application claims priority to India Provisional Patent Application Serial Number 201621034605, filed Oct. 10, 2016, which is hereby incorporated by reference.

BACKGROUND

This disclosure relates to circuits, power systems, and methods for obtaining and combining power. Examples disclosed herein may be used to obtain a power output from an arrangement of direct current (DC) power sources.

In a distributed DC network, plural DC power sources may be interconnected in a series-parallel combination. However, power output from an array of DC power sources may be degraded due to a mismatch in voltage and/or current across individual DC power sources. For example, in a parallel arrangement of DC power sources, parallel legs having sources with lower voltages may sink power from other legs, and thereby reduce overall power output. Similarly, in a series of DC power sources, a defect in one DC power source may suppress the output from all series-connected DC power sources.

A mismatch in voltage and/or current is of concern for DC power sources connected in an array, such as cells used in lead acid batteries, lithium ion batteries, and solar photovoltaic cells and panels, which optimally operate at a point near maximum power. For example, in an arrangement of solar photovoltaic (PV) panels, a mismatch in voltage and/or current across each PV panel may occur due to shading of one or more panel. Shading as used herein refers to any obstruction of incident light on a PV panel, such as by clouds, nearby buildings, trees, and animals. In another example, a battery pack comprising two or more battery cells may experience a mismatch in voltage and/or current. Such a mismatch may occur due to varying chemistries among battery cells, such as a battery pack comprising a lithium ion cell(s) and a lead acid cell(s), for example. In yet another examples, such a mismatch may occur due to varying age and/or capacity of interconnected battery cells and/or battery packs. Varying ages and/or capacities may occur due to one or more battery cells being replaced with new and/or full capacity battery cells, while other battery cell(s) of older age and/or diminished capacity remain in the battery pack. Further, for any example DC power source, uneven material degradation among individual interconnected DC power sources may cause a mismatch in current and/or voltage across one or more DC power source. Uneven material degradation among DC power sources may occur due to age, environmental exposure, use conditions, charge/discharge history, and/or manufacturer quality, among other factors.

Various configurations may be used to overcome the problems described above relating to mismatched voltage and/or current among plural interconnected direct current (DC) power sources, such as plural photovoltaic (PV) panels. In some examples, a bypass diode may be positioned in reverse bias across each PV panel to assist in supplying power at reduced voltage, which may prevent formation of hotspots due to mismatch between individual PV panels. However, this approach introduces multiple peaks in power-voltage characteristics of the string, and necessitates a complex maximum power point tracking (MPPT) algorithm to extract maximum power from each PV panel. In other examples, shading conditions may be addressed using a full power processing Distributed Maximum Power Point Tracking (DMPPT) system or a differential power processing DMPPT system.

In a full power processing Distributed Maximum Power Point Tracking (DMPPT) system, each DC power source (e.g. PV panel) in an array of DC power sources is connected to a corresponding DC-DC converter, which processes all power generated by its corresponding DC power source regardless of whether mismatch is present between two or more DC power sources in the array. FIG. 1 schematically shows a conventional architecture of a full power processing DMPPT system 100 including a plurality of PV panels 102A-102N, connected to a plurality of corresponding DC-DC converters 104A-104N. As shown in FIG. 1, the plurality of DC-DC converters 104A-104N are connected in series, where each DC-DC converter may be configured as a buck-boost circuit for power optimization. It will be understood that the depiction of each DC power source as a PV panel is illustrative for purpose of example, and that each PV panel in FIG. 1 and all figures described herein may be replaced by any type of DC power source or combination of DC power sources.

FIG. 2 schematically shows another conventional architecture of a full power processing DMPPT system 200 including a plurality of PV panels 202A-202N and a plurality of DC-DC converters 204A-204N. In this example, the plurality of DC-DC converters 204A-204N are connected in parallel, and each DC-DC converter 204A-204N may be configured as a boost circuit for power optimization. In the full power processing architectures of FIGS. 1 and 2, full current from each PV panel is processed by electronics of its corresponding DC-DC converter during both uniform and non-uniform incident solar radiation conditions. As a result, such full power processing systems incur high conversion losses.

In a differential power processing DMPPT system, a DC-DC converter may selectively operate when a mismatch in voltage and/or current occurs among neighboring DC power sources. FIG. 2 schematically shows an example architecture of a differential power processing DMPPT system 200 including charge shuffling circuits 302A-302C, which may each be configured as a buck-boost circuit. In the depicted charge shuffling scheme, each DC-DC converter 302A-302C assists in balancing a mismatch in voltage and/or current between neighboring series-connected DC sources (e.g. PV panels 204A-204D) by intermixing powers of the neighboring DC power sources. For example, neighboring DC power sources experiencing a mismatch in power output may be battery cells of varying types (e.g. a lithium ion cell and a lead acid cell), PV panels experiencing varying amounts of incident light, and battery cells of varying age and/or material degradation. A mismatch in current between two neighboring PV panels may be processed by the corresponding charge shuffling circuit while remaining current flows through the series-connected string of DC power sources. Accordingly, power flow is shunted when a mismatch exists between neighboring PV panels, which may reduce the impact of the mismatch on the string's overall power output. When no mismatch in voltage and/or current is present between neighboring PV panels, each DC-DC converter may be bypassed in the path of power flow.

Another example of a differential power processing DMPPT system is a returned energy current converter (RECC), where a feed-backward power flow architecture may be used to compensate for a required differential current in a string of DC power sources. FIG. 4 schematically shows a feed-backward power flow architecture 400 including a plurality of isolated DC-DC converters 404A-404N connected across a plurality of DC power sources 402A-402N (e.g. PV panels), where each isolated DC-DC converter 404A-404N is configured as a buck circuit. In this example, an isolated DC-DC converter(s) 404A-404N may pull a deficit amount of current from a DC link and route the current to a corresponding source (e.g. PV panel(s) 402A-402N) to balance a deficient source, such as a shaded PV panel. FIG. 5 schematically shows a feed-forward power flow architecture of a DMPPT system 500, where excess current from an un-shaded PV panel(s) in a string of PV panels 502A-502N is pushed into a corresponding isolated DC-DC converter 504A-504N, configured as a boost circuit, and transmitted to a load.

One potential problem with these architectures arises from the isolated DC-DC converters commonly used in differential power processing and RECC architectures, as shown by the examples of FIGS. 2-5, which are bulky and inefficient. Further, isolated DC-DC converters may increase cost and control complexity in systems utilizing plural interconnected DC power sources and isolated DC-DC converters, which may result in relatively high conversion losses and reduce scalability of such systems.

SUMMARY

Accordingly, examples are disclosed that may help to address the problem of voltage and/or current mismatch among plural DC power sources. The disclosed examples may provide greater efficiency and lower conversion losses compared to the systems described above, permit the use of many such DC-DC convertors to be array together, and allow optimization of the overall power and energy delivered to the load.

One example provides a power conversion system configured to provide a power output from a series arrangement of DC power sources, the power conversion system comprising a plurality of DC power sources connected in a series PV(n), n=1 to x. The power conversion system comprises, for each power source PV(n) for n=1 to x−1, an intermediate bidirectional voltage converter VC(n) connected to a first terminal of the power source PV(n), the intermediate bidirectional voltage converter VC(n) also connected to a first terminal of power source PV(x) and to a second terminal of power source PV(1), the intermediate bidirectional voltage converter VC(n) comprising a first switch operable in a pulsed mode to boost a power output by power source PV(n) and a second switch operable in a pulsed mode to reduce a power output by power source PV(n) to thereby stabilize power output at the first terminal of power source PV(x). The power conversion system also comprises a balancer VC(x) connectable to the first terminal of PV(x) and to a load.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6C schematically shows an example of time-displaced energy packet generation and combination utilizing the power supply system of FIGS. 6A-6B.

FIGS. 9A-9C show a flow diagram illustrating an example method for providing an output power from a series arrangement of direct current (DC) power sources.

DETAILED DESCRIPTION

In view of the above description, there remains a need for a system which efficiently extracts maximum power from an array of mismatched independent DC power sources, such as a plurality of interconnected PV panels and/or batteries. Accordingly, examples are disclosed that relate to a differential power processing DMPPT system comprising a plurality of bidirectional DC-DC voltage converters that may balance a string current using a combination of feed-forward and feed backward power flow concepts. In feed-forward power flow, excess current from a DC power source(s) may be pushed into a bidirectional DC-DC voltage converter(s). Conversely, in feed-backward power flow, deficit current may be pulled from a DC link through a bidirectional DC-DC voltage converter(s). In some examples, the plurality of bidirectional DC-DC voltage converters may comprise a nested arrangement sharing a common ground, which allows optimal power processing to be performed by electronic components of each bidirectional DC-DC voltage converter. As any power processing may incur losses, optimal power processing as used herein refers to operating a bidirectional DC-DC voltage converter in instances of a mismatch among two or more DC power sources, which may otherwise restrict power output of the array of DC power sources. For example, power may be routed to a bidirectional DC-DC voltage converter in response to a mismatch among voltage and/or current across individual PV panels, and in other examples, bidirectional DC-DC voltage converters may be bypassed in the path of power flow. In some examples, the bidirectional DC-DC voltage converters may be operated via a microcontroller, which may reduce hardware complexity of the system. Further, the disclosed embodiments may be used with distributed and plural DC power sources, including but not limited to batteries having different chemistries, histories of use, and/or ages, solar cells and/or panels, super-capacitors, fuel cells, and other such distributed power generation systems.

Figure 6A:
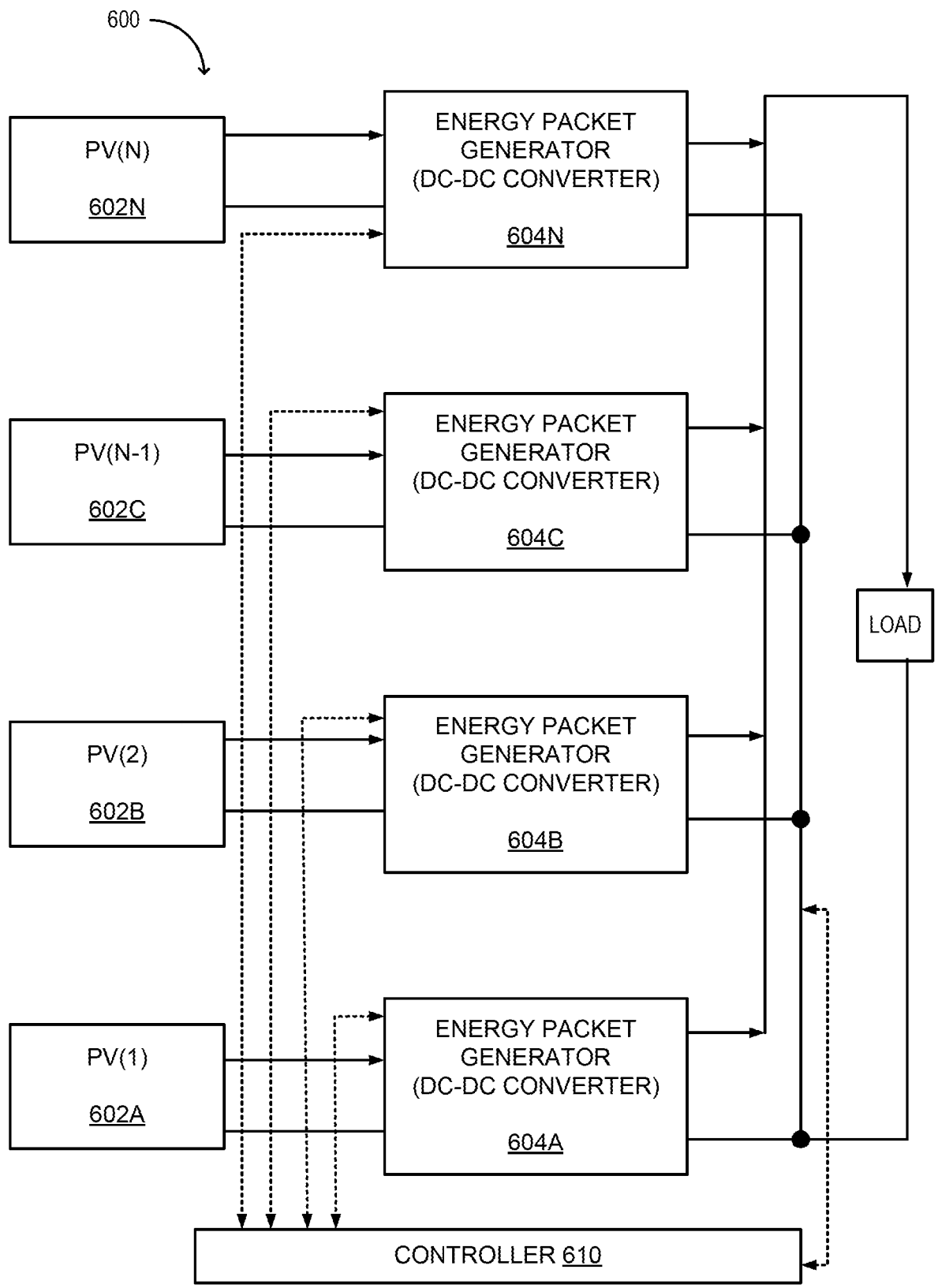
FIG. 6A schematically shows an example power supply system.
Figure 6B:
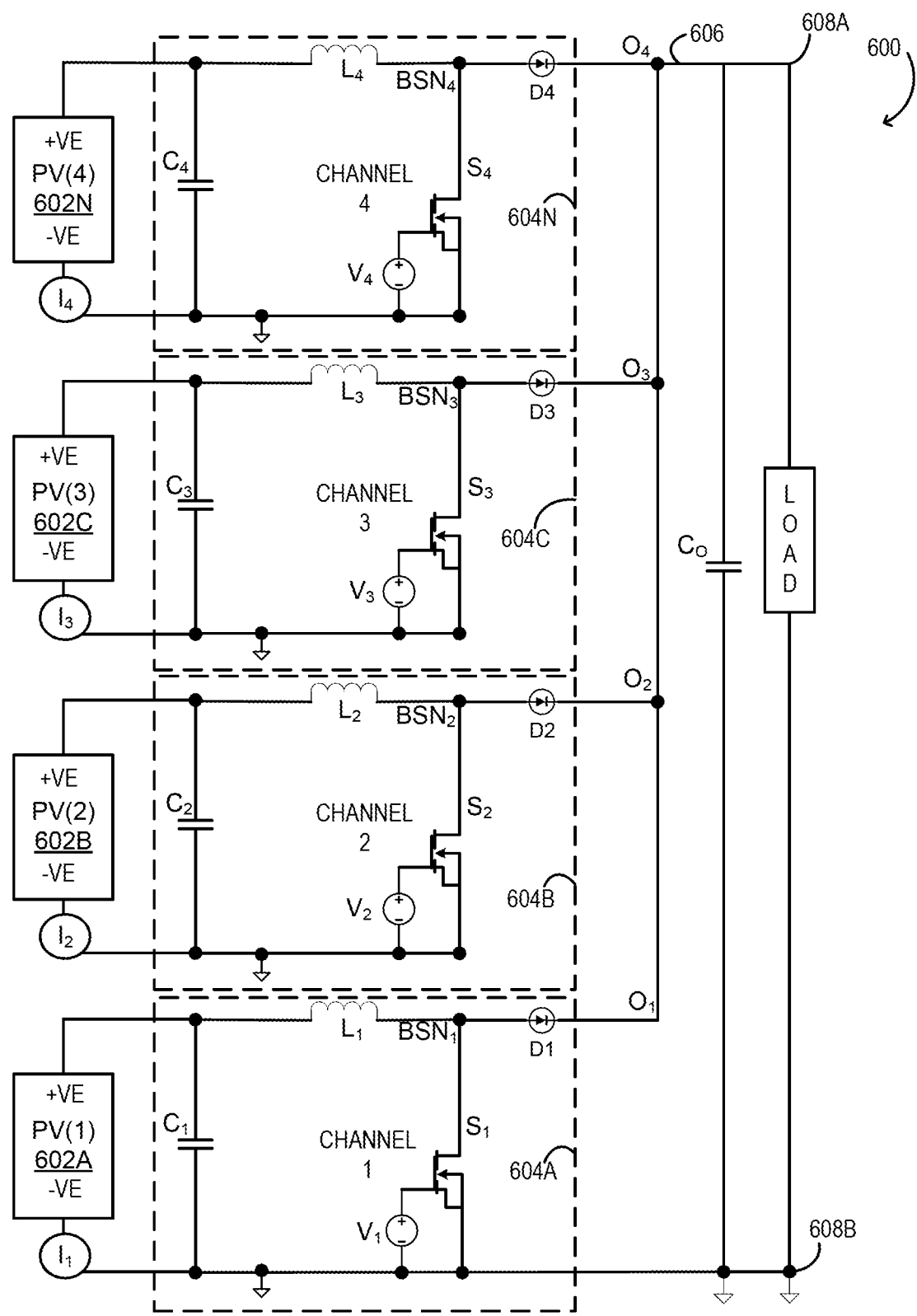
FIG. 6B illustrates an example circuit diagram of the power supply system of FIG. 6A.

FIGS. 6A-6B schematically show an example power supply system 600 which may be used to address the previously described problems related to mismatch among a plurality of interconnected DC power sources. Briefly, the power supply system 600 comprises a plurality of direct current (DC) power sources 602A-602N, each comprising a first terminal connected to a corresponding energy packet generator 604A-604N to provide power to the corresponding energy packet generator 604A-604N. Each energy packet generator 604A-604N comprises an energy storage component $C_n$, a switching component $S_n$ operable in a pulsed mode to boost a power output at the DC power source 602A-602N, a rectifying component $D_n$, and an output $O_n$ connected to a common conductor 606. The power supply system 600 also comprises an energy combiner $C_o$ connected between the common conductor 606 and a second terminal of each DC power source, and a pair of output terminals 608A-B connectable to a load, the pair of output terminals 608A-B arranged in parallel with the energy combiner $C_o$. Each energy packet generator 604A-604N is electrically connected to a corresponding DC power source 602A-602N, where N illustrates that any suitable number of DC power sources and corresponding energy packet generators may be utilized. In the example of FIG. 6A, each DC power source represents a PV panel PV(1) to PV(4), which each may include a single solar cell or multiple solar cells connected in series and/or parallel. In other examples, each DC power source 602A-602N may comprise one or more solar cells and/or panels, batteries, super capacitors, and/or fuel cells, as examples.

As shown in FIG. 6A, each energy packet generator 604A-604N is connected in parallel and disposed between the plurality of PV panels 602A-602N and a load. Each energy packet generator 604A-604N comprises a DC-DC voltage converter configured to generate an output including energy pulses of controlled duration and amplitude. In some examples, outputs from the plurality of energy packet generators 604A-604N may be combined using an energy packet combiner circuit $C_o$ to generate an output signal seen at the load. In the example of FIG. 6A, a controller 610 is in electrical communication with each energy packet generator 604A-604N and the energy packet combiner $C_o$ to control generation and combination of electrical energy packets. It will be understood that the controller 610 depicted in FIG. 6A is shown for the purpose of example and is not intended to be limiting in any manner, as the power supply system 600 may use any suitable control logic to control the generation and combination of power signals received from each DC power source and each energy packet generator.

FIG. 6B is an example circuit diagram of the power supply system 600 shown in FIG. 6A. Each energy packet generator 604A-604C comprises a boost circuit configured to boost a power output by a corresponding DC power source 602A-602N. In the example of FIG. 6B, each energy packet generator 604A-604N includes a capacitor as an energy storage component $C_n$, an inductor $L_n$, a transistor as a switching component $S_n$, and a diode $D_n$ as a rectifying component positioned at an output of each boost node $BSN_n$. The output $O_n$ of each energy packet generator 604A-604N is connected to a common conductor 606.

Figure 1:
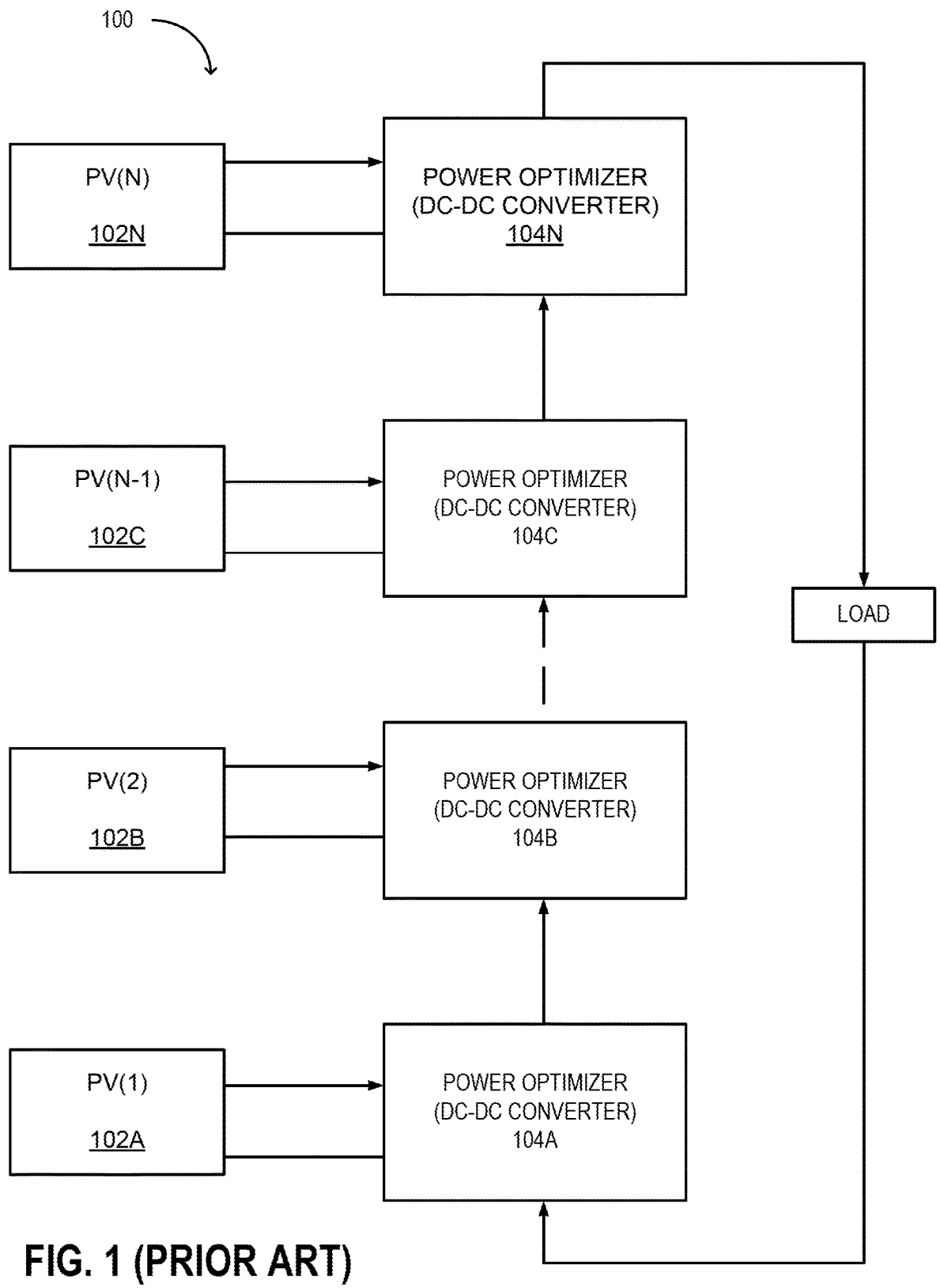
FIG. 1 schematically shows a conventional architecture of a full power processing Distributed Maximum Power Point Tracking (DMPPT) system where output from each DC-DC converter is connected in series.
Figure 2:
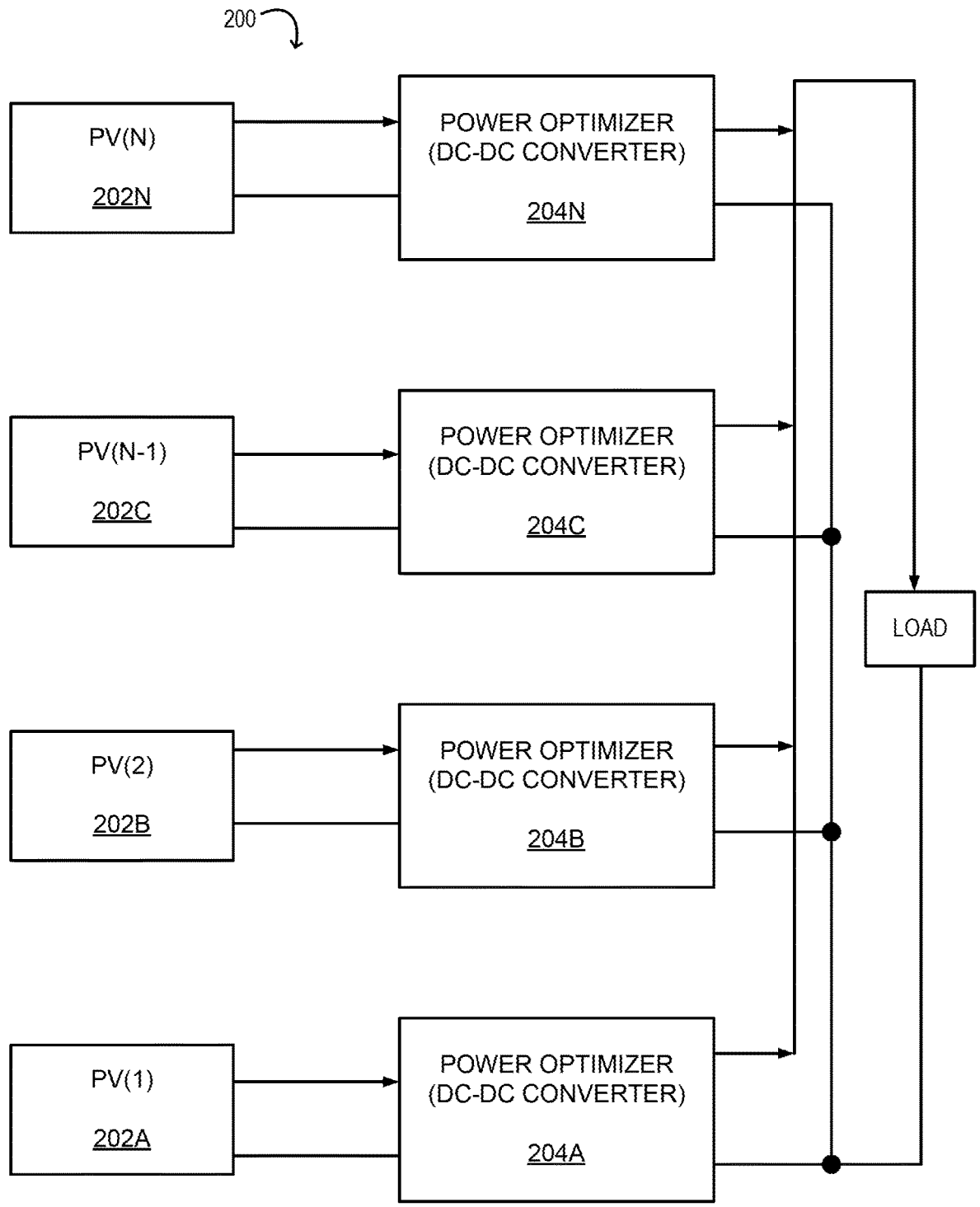
FIG. 2 schematically shows a conventional architecture of a full power processing DMPPT system where output from each DC-DC converter is connected in parallel.
Figure 3:
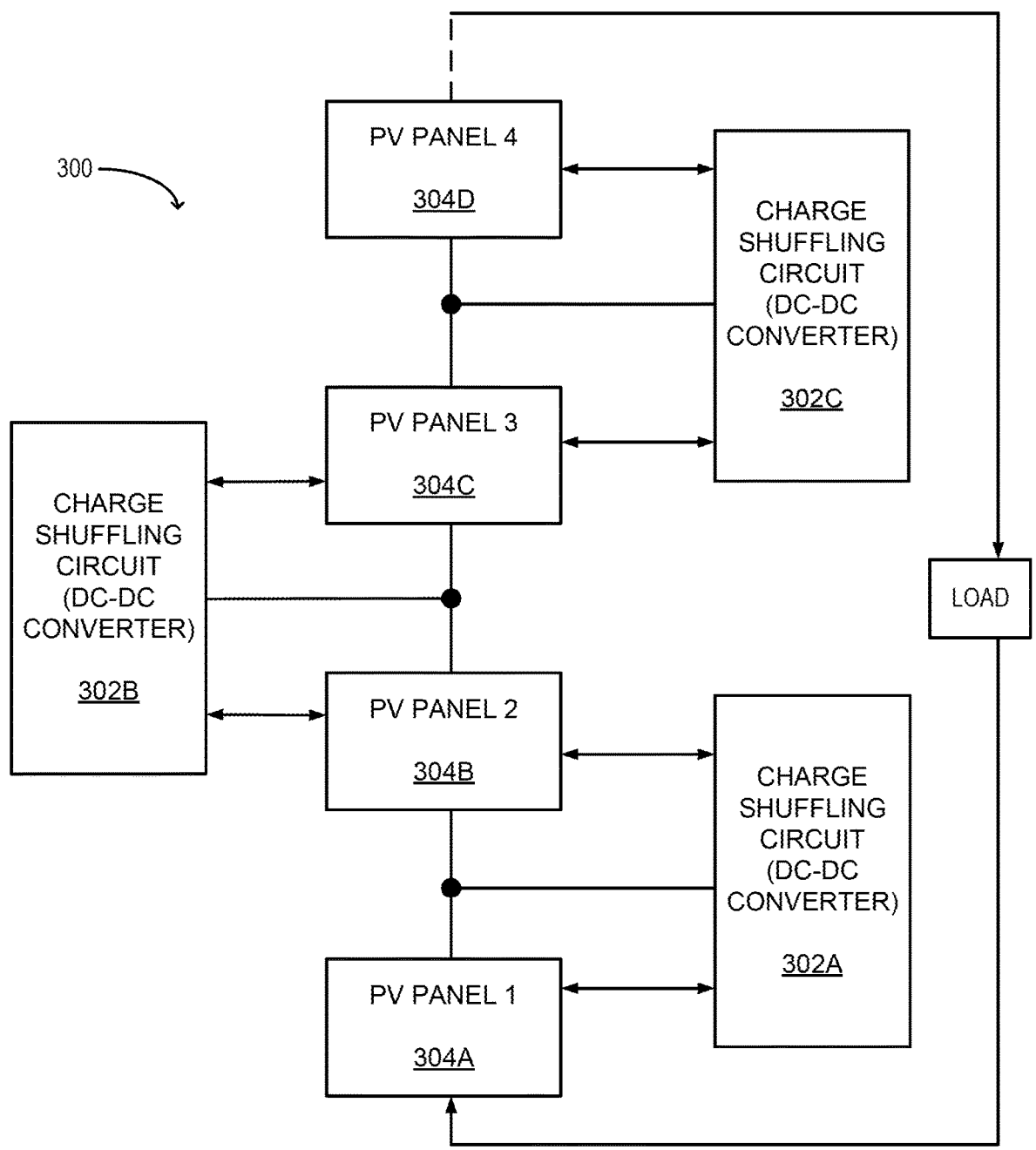
FIG. 3 schematically shows a conventional architecture of a power shuffling scheme of a DMPPT system.
Figure 4:
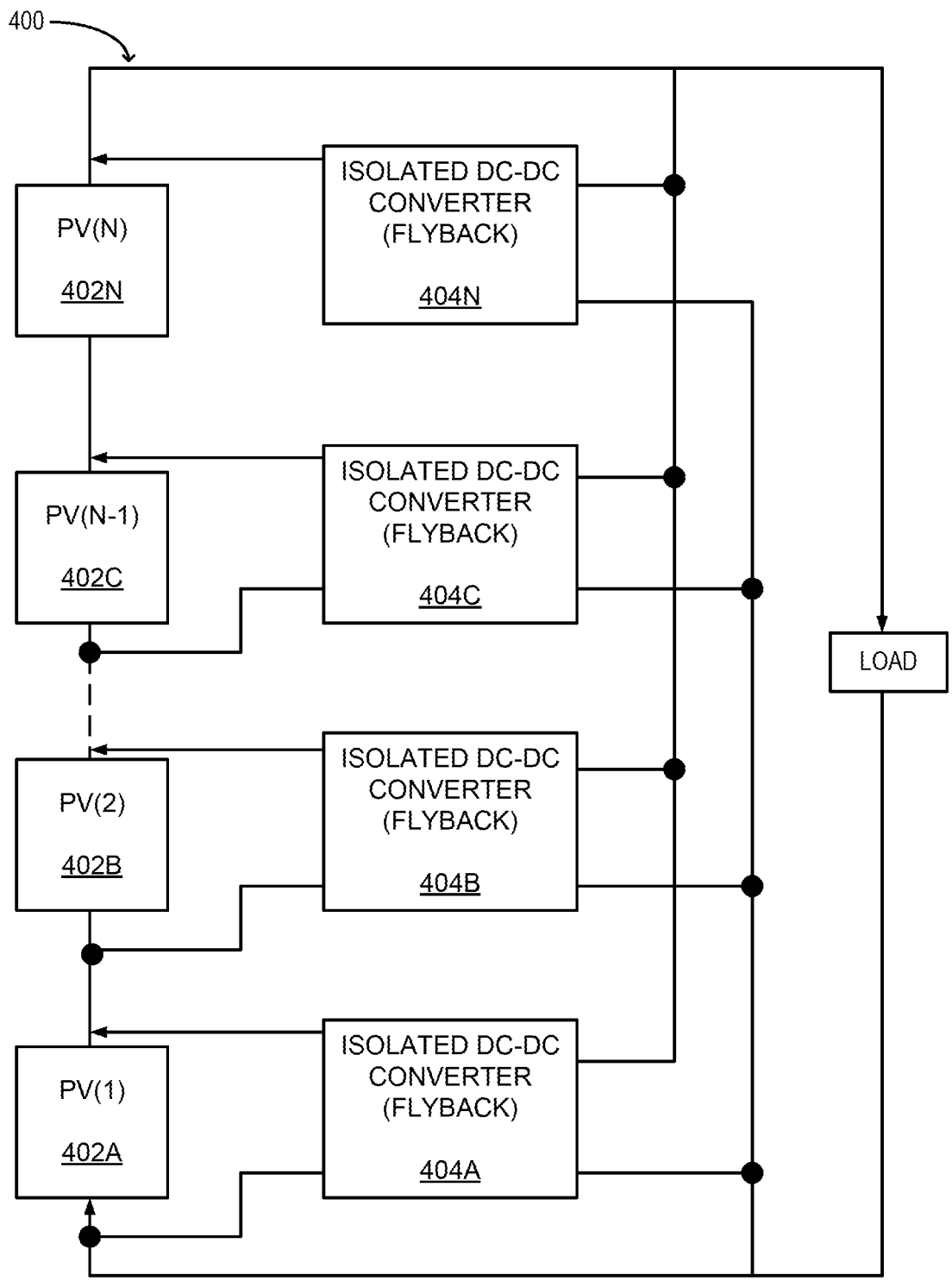
FIG. 4 schematically shows a conventional feed-backward power flow architecture of a returned energy current converter (RECC).
Figure 5:
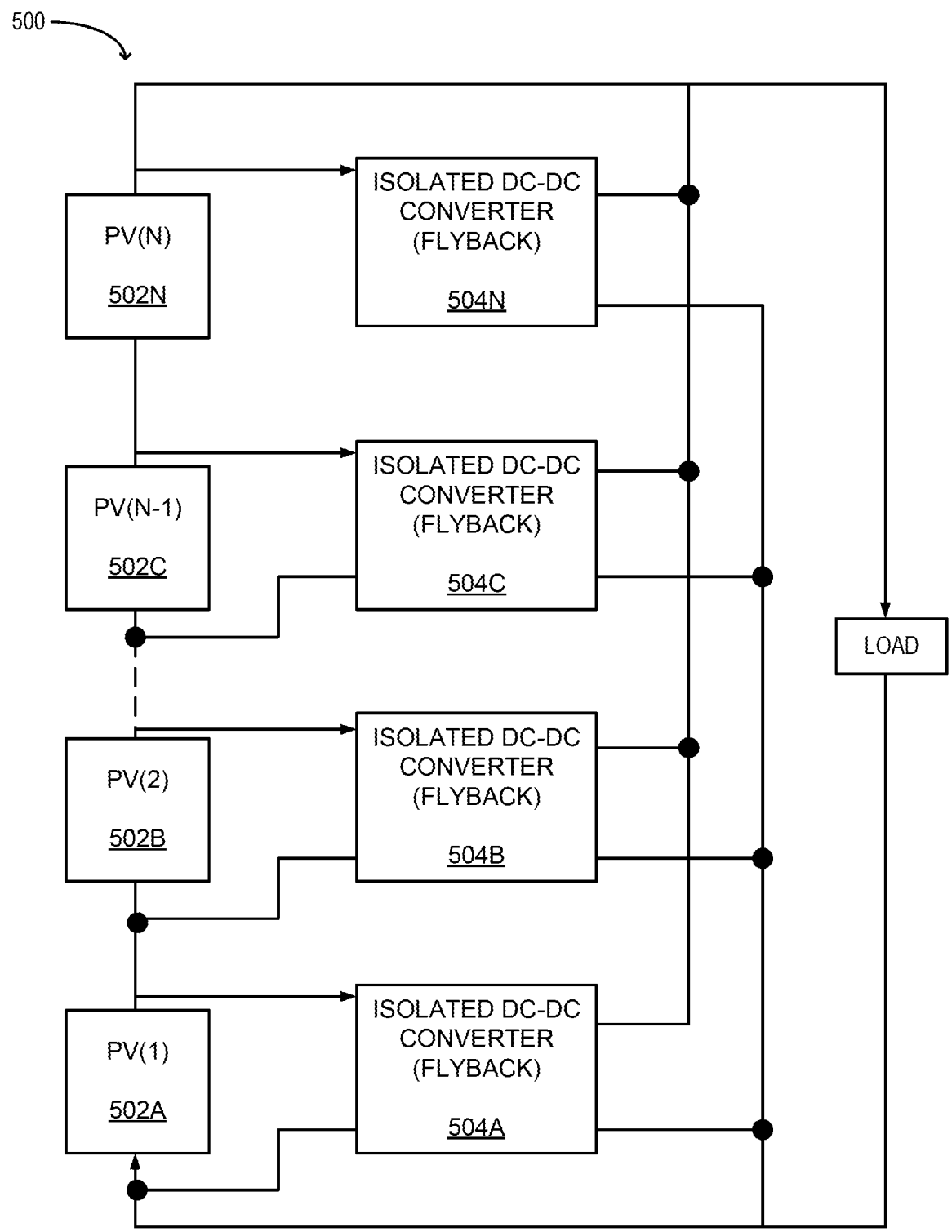
FIG. 5 schematically shows a conventional feed-forward architecture in a DMPPT system.

Each energy packet generator 604A-604N may be configured to output time-displaced energy packets by controlling a gate voltage $V_n$ of each switching component $S_n$ according to a duty cycle. During operation of the power supply system 600, the switching component $S_n$ remains in an open (e.g. OFF) state until an applied gate voltage $V_n$ permits current flow through the switching component $S_n$. As current flows from the positive terminal of each DC power source, through the inductor $L_n$, and through the switching component $S_n$, energy is stored in the inductor $L_n$ as a magnetic field. When the gate voltage $V_n$ is turned off, the switching component $S_n$ is switched from the closed state (e.g. permitting current flow) to the open state, causing a polarity change across the rectifying component $D_n$, such that current flows through the rectifying component $D_n$ to the output $O_n$. Though depicted as a MOSFET in FIG. 4B, the switching component $S_n$ may comprise one or more of a MOSFET, an insulated gate bipolar transistor (IGBT), a field-effect transistor, a bipolar junction transistor, a thyristor, a gate-controlled thyristor, a silicon-controlled rectifier, and any other suitable electronic switching device.

FIG. 6C illustrates time-displaced outputs of energy packets 612A-612N generated by the plurality of energy packet generators 604A-604N shown in FIGS. 6A-6B. Energy packets 612A-612N may be combined by an energy packet combiner circuit $C_o$ to produce a combined output signal 614. The energy packet combiner circuit $C_o$ may include, but is not limited to, a capacitor, which may store and release combined energy pulses as an energy packet to provide a DC output. Energy packets may additionally or alternatively be combined using circuit techniques including, but not limited to, resonance and active filters.

As described above, some DC power sources may operate optimally near maximum power. In the example of FIGS. 6A-6C, maximum power may be collected from the plurality of DC power sources 602A-602N by matching the impedance of each energy packet generator 604A-604N to the impedance of each DC power source. One approach to achieve impedance matching between each energy packet generator and its corresponding DC power source includes adjusting the duty cycle (e.g. pulse rate) of the switching component $S_n$ for each energy packet generator 604A-604N. As the duty cycle determines a duration of time for which each energy packet generator is on or off, adjusting the duty cycle may control time generation of electrical energy packets. Staggered controls can be used to generate a plurality of energy packets 612A-612N from a plurality of DC power sources (e.g. the plurality of PV panels 602A-602N). In the example of FIG. 6C, the combined output signal 614 shows a smooth DC output produced by interleaving the energy packets 612A-612N from each energy packet generator.

Figure 7A:
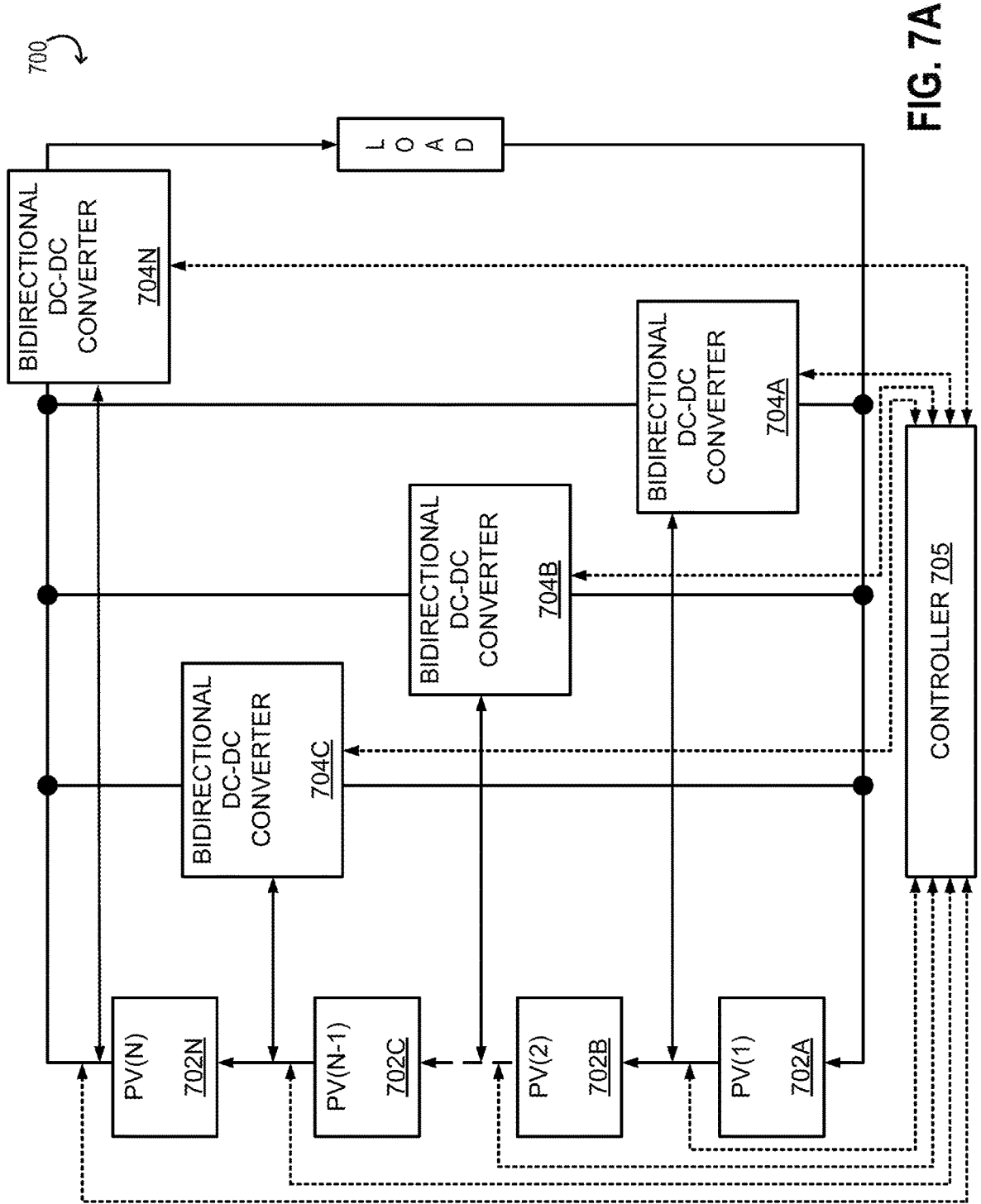
FIG. 7A schematically shows an example power conversion system including a nested arrangement of bidirectional DC-DC voltage converters.

The energy supply system 600 of FIGS. 6A-6C provide a combined DC output from a plurality of DC power sources connected in parallel via a plurality of corresponding energy packet generators. In other examples, the plurality of DC power sources may be connected in series. FIG. 7A illustrates a block diagram of an example power conversion system 700 configured to provide a power output from a series arrangement of direct current (DC) power sources 702A-702N, where N illustrates that any suitable number of DC power sources may be used. The power conversion system comprises a plurality of DC power sources connected in a series PV(n), n=1 to x. For each power source PV(n) for n=1 to x−1, the power conversion system comprises an intermediate bidirectional voltage converter VC(n) connected to a first terminal of the power source PV(n), the intermediate bidirectional voltage converter VC(n) also connected to a first terminal of power source PV(x) and to a second terminal of power source PV(1). The intermediate bidirectional voltage converter VC(n) comprises a first switch $M_{2n}$ operable in a pulsed mode to boost a power output by power source PV(n) and a second switch $M_{2n-1}$ operable in a pulsed mode to reduce a power output by power source PV(n), to thereby stabilize power output at the first terminal of power source PV(x). The power conversion system 700 also comprises a balancer VC(x) connected to the first terminal of PV(x) and to a load.

As shown in FIG. 7A, a nested arrangement of bidirectional DC-DC voltage converters 704A-704N is connected across the plurality of DC power sources 702A-702N. Each DC power source 702A-702N is electrically connected to a corresponding bidirectional DC-DC voltage converter 704A-704N. The nested arrangement of bidirectional DC-DC voltage converters 704A-704N may be used to boost or reduce a voltage output by any DC power source by selectively utilizing feed-forward and feed-backward power flow concepts. A controller 705 may be in electrical communication with each bidirectional DC-DC voltage converter 704A-704N and each DC power source 702A-702N. The controller 705 is configured to control whether a bidirectional DC-DC voltage converter operates in a pulsed mode to reduce a voltage output by a corresponding power source, operates in a pulsed mode to boost a voltage output by a corresponding power source, or is bypassed in the path of power flow. In other examples, each bidirectional DC-DC voltage converter may comprise control logic.

In the nested arrangement of bidirectional DC-DC voltage converters, the power conversion system may be configured to perform optimal power processing to provide energy packets to a DC power source(s) when a mismatch in power occurs among the series-connected DC power sources. As used herein, the term "mismatch" with regard to power represents a difference in voltage and/or current between two or more DC power sources above a threshold magnitude. For example, the plurality of bidirectional DC-DC voltage converters 704A-704N may be configured to compensate for a mismatch in (a) magnitude of currents generated by each of the DC power sources, (b) voltages measured between the DC power sources, or (c) both voltage and current generated by each of the DC power sources. In some examples, the plurality of bidirectional DC-DC voltage converters 704A-704B may be configured to extract maximum power from each DC power source.

Figure 7B:
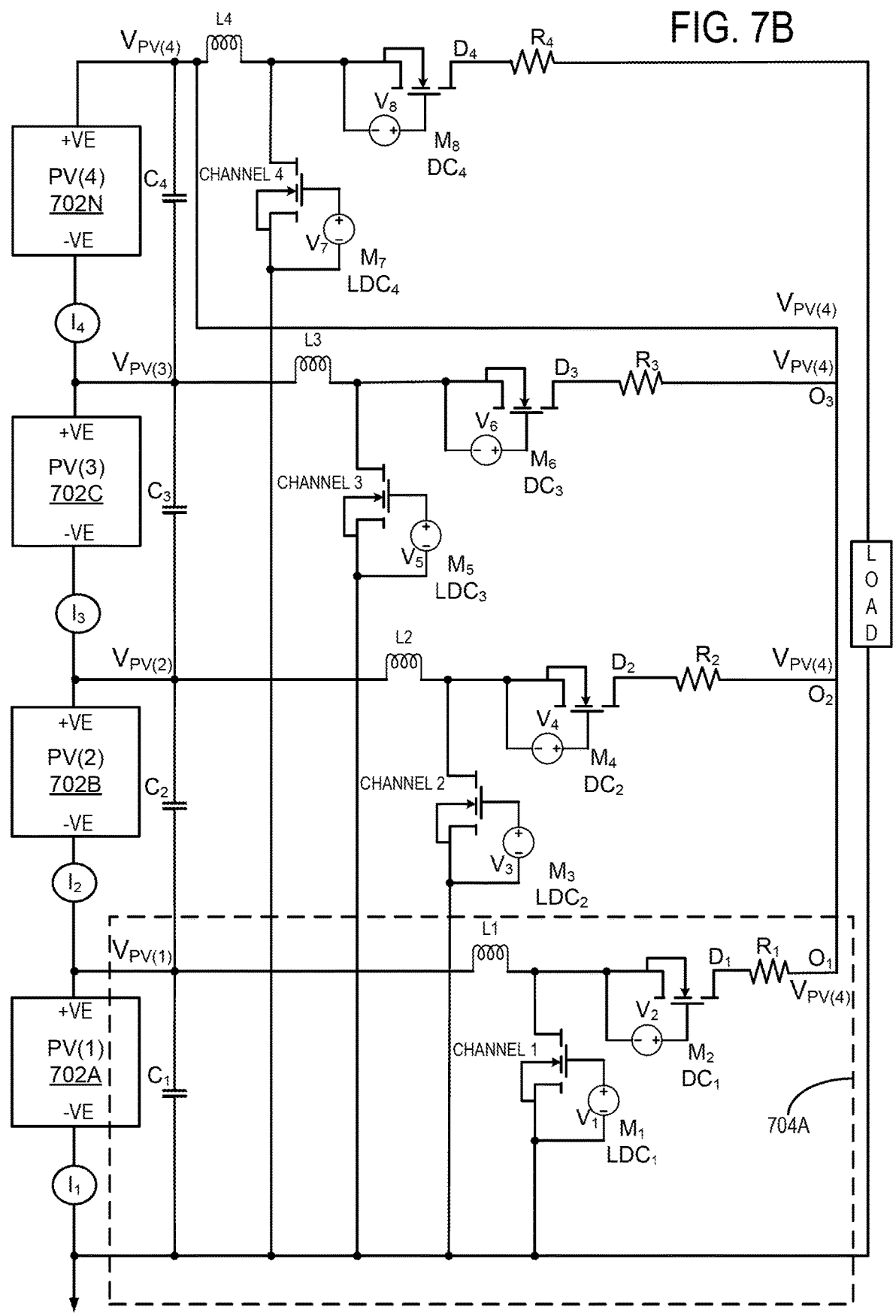
FIG. 7B illustrates a circuit diagram of the example power conversion system of FIG. 7A.

FIG. 7B illustrates an example circuit diagram of the power conversion system 700 of FIG. 7A. The plurality of DC power sources 702A-702N are depicted as solar photovoltaic panels PV(1) to PV(4), though in other examples, each DC power source may comprise one or more solar cells and/or panels, fuel cells, super capacitors, lithium ion cells, lead acid cells, and batteries. Each DC power source is electrically connected to a corresponding bidirectional DC-DC voltage converter, where dashed region 704A in FIG. 7B represents the bidirectional DC-DC voltage converter 704A corresponding to DC power source 702A (e.g., PV(1)). Other bidirectional voltage converters may be similarly delineated, but are not shown in FIG. 7B for clarity.

In this example, the power conversion system 700 comprises a module of four PV panels PV(n), n=1 to 4 and four corresponding bidirectional voltage converters VC(n), n=1 to 4, though in other examples, any suitable number of DC power sources and corresponding bidirectional DC-DC voltage converters may be utilized.

As described above, one or more of the bidirectional DC-DC voltage converters may be configured to operate when there is a mismatch in power among two or more DC power sources 702A-702N, and may otherwise be bypassed in the path of power flow. Current and/or voltage across each DC power source may be monitored to determine whether to mismatch in power exists among two or more DC power sources. In FIG. 7B, current sensors $I_n$ depict an example location where current across each DC power source may be monitored at a negative terminal of each DC power source. It will be understood that a placement of current sensors $I_n$ in FIG. 7B is shown by example, and that current and/or voltage measurements across each DC power source may be obtained in any suitable manner and at any suitable location in the system.

To selectively boost or reduce a power output by one or more DC power sources, each bidirectional DC-DC voltage converter 704A-704N in the nested arrangement includes a boost diode/buck switch, which provides switching and charge balancing. In the example of FIG. 7B, each bidirectional DC-DC voltage converter 704A-704N includes a MOSFET as a first switch $M_{2n}$ and a MOSFET as a second switch $M_{2n-1}$. The second switch $M_{2n-1}$ switches to ground with a second duty cycle $LDC_n$ of a gate source voltage $V_{2n-1}$, and the first switch $M_{2n}$ switches to the load with a first duty cycle $DC_n$ of a gate source voltage Van. In other examples, one or more of the first switch and the second switch may comprise, as non-limiting examples, one or more bipolar junction transistors (BJT), thyristors, field-effect transistors, gate-controlled thyristors, silicon-controlled rectifiers, and any other suitable electronic switching devices.

When one or more of the first and second switches are a MOSFET or another type of switching device comprising an intrinsic body diode, the intrinsic body diode $D_n$, may facilitate current flow when the switch acts as a boost switch in a forward direction, and the intrinsic body diode $D_n$ may act as a freewheeling diode when the circuit acts as a buck circuit in the reverse direction. As described above, the first switch $M_{2n}$ may operate in a pulsed mode according to a first duty cycle $DC_n$ and the second switch $M_{2n-1}$ may be operated in a pulsed mode according to a second duty cycle $LDC_n$. An inductor $L_n$ may produce a fly-back voltage upon sudden reduction and/or removal of a power supply, which occurs during operation of the first and second switches in each bidirectional DC-DC voltage converter. Accordingly, in some examples, each bidirectional DC-DC voltage converter may include a freewheeling diode, which may help prevent a sudden voltage spike.

Each bidirectional DC-DC voltage converter 704A-704N comprises an energy storage component $C_n$. In the example of FIG. 7B, the energy storage component $C_n$ comprises a capacitor electrically connected in parallel with a corresponding DC power source PV(n). The energy storage component may store electrical charge, and release electrical energy generated by the bidirectional DC-DC voltage converter to balance a mismatch among two or more DC power sources.

In the example of FIG. 7B, the power conversion system 700 is arranged as a module comprising four PV panels, PV(n), n=1 to 4. In this example, the bidirectional DC-DC voltage converters corresponding to PV(1), PV(2), and PV(3) are intermediate bidirectional DC-DC voltage converters VC(1), VC(2), and VC(3), and the bidirectional DC-DC voltage converter corresponding to PV(4) is a balancer VC(4). The balancer VC(4) is connectable to a load, and thus may be configured to provide a combined power output according to the load. In some examples, the balancer may be configured to boost the combined output from the plurality of DC power sources according to the load. Accordingly, the balancer may comprise electrical components having higher power ratings than components of the intermediate bidirectional DC-DC voltage converters.

In operation of the power conversion system of FIG. 7B, a voltage $V_{PV(n)}$ may be measured at a first terminal of each DC power source and/or a current $I_n$ may be measured across each DC power source. In one example, the voltage measured at the first terminal of each DC power source is $V_{PV(1)}$=40V, $V_{PV(2)}$=80V, $V_{PV(3)}$=120V, and $V_{PV(4)}$=160V, and the current measured across each DC power source is $I_1$=2 A, $I_2$=4 A, $I_3$=6 A, and $I_4$=8 A. In this example, a mismatch in voltage does not exist across each DC power source, and the path of power flow may bypass the bidirectional DC-DC voltage converters 704A-704N. However, if one or more DC power source experiences a reduced power output, such as that caused by shading of one more PV panels, current may be routed through one or more bidirectional DC-DC voltage converters 704A-704N to balance the power output of each DC power source. As shown in FIG. 7B, an output of each intermediate bidirectional DC-DC voltage converter 704A-704C is connected to a first terminal of DC power source PV(4). Thus, each intermediate bi-directional DC-DC voltage converter may pull power from the combined output of the series connected DC power sources to balance a power mismatch.

In one potential advantage of the present disclosure, a power conversion system as disclosed herein may be scaled by cascading multiple modules of the type shown by FIGS. 7A-7B. This scalable modular architecture may be advantageous for streamlining product offerings. For example, a single module may be sufficient for smaller load applications utilizing a smaller number of DC power source, such as residential use, whereas two or more modules may be connected to supply a larger load via a larger number of DC power sources, such as in commercial use. In some examples, different modules may be provided that are configured to work with different numbers of DC power sources. As one non-limiting example, a module comprising four DC power sources may be connected in series with a module comprising five DC power sources. Further, operating plural bidirectional DC-DC voltage converters to perform maximum power point tracking may support different valued DC power sources being connected in a single module. For example, one module may comprise both 24V and 36V rated DC power sources. In other examples, the plural bidirectional DC-DC voltage converters in a module may have components with substantially similar power ratings.

Figure 8:
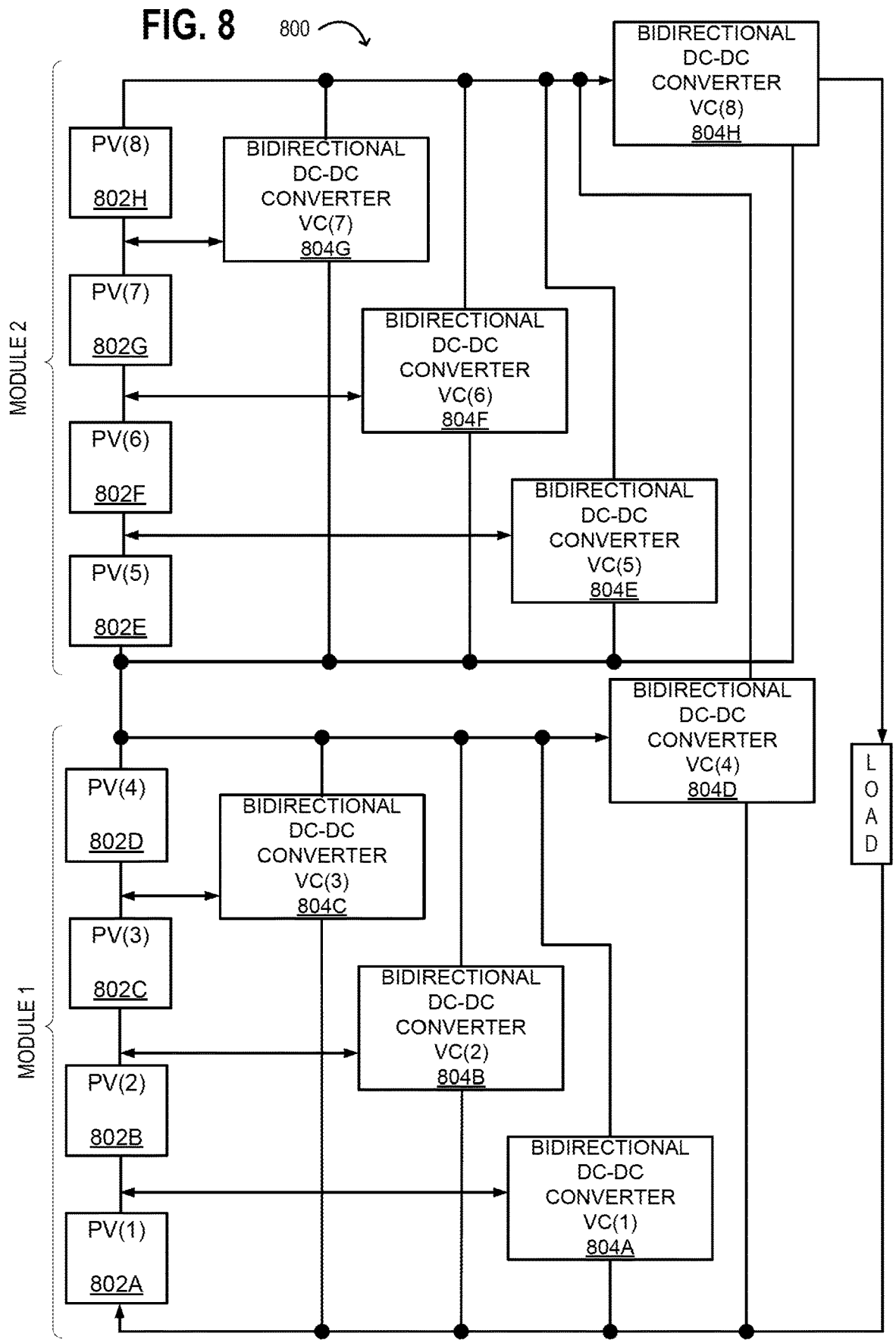
FIG. 8 schematically shows an example system including multiple modules of the example power conversion system shown in FIGS. 7A-7B.

FIG. 8 schematically shows an example modular architecture comprising two modules. In this example, a plurality of DC power sources PV(n), n=1 to 8 are arranged in two modules, where a first module comprises a first plurality of DC power sources PV(1), PV(2), PV(3), and PV(4), and a second module comprises a second plurality of DC power sources PV(5), PV(6), PV(7), and PV(8). Mismatch in one or more of voltage and current among individual DC power sources PV(n) may be determined separately for each module. When a mismatch is determined between two or more DC power sources of the first module 802A-802D but not between any DC power sources of the second module, one or more bidirectional DC-DC voltage converters 804A-804D may be operated according to a maximum power point tracking (MPPT) algorithm while bidirectional DC-DC voltage converters of the second module 804E-804H are bypassed. Similarly, when a mismatch is determined between two or more DC power sources of the second module 802E-802H but not between any DC power sources of the first module, one or more bidirectional DC-DC voltage converters 804A-804D may be operated according to a maximum power point tracking (MPPT) algorithm while bidirectional DC-DC voltage converters of the second module 804E-804H. In some instances, the first plurality of DC power sources 802A-802D may operate without a voltage and/or current mismatch, and DC power sources of the second module 804E-804H may also operate without a power mismatch among its DC power sources, but a mismatch may exist between the output of each overall module. In such instances, the fourth bidirectional DC-DC voltage converter VC(4) acts as a balancer between the two modules by balancing a voltage, current or power output by one or both modules. voltage mismatch between the two modules in case of mismatch in power. In one potential advantage of the nested configuration of bidirectional DC-DC voltage converters, the balancer 804D of the first module and the balancer of the second module 804H are connected to a first terminal of PV(8) and connectable to a load. The balancers 804D and 804H may boost a combined output of the DC power sources based upon a load, and thus may utilize components having higher power ratings than the bidirectional DC-DC voltage converters 804A-804C and 804E-804G. This may reduce an overall cost of the power conversion system, as the system may utilize lower power componentry for each bidirectional DC-DC voltage converter 804A-804C and 804E-804G.

Figure 9A:
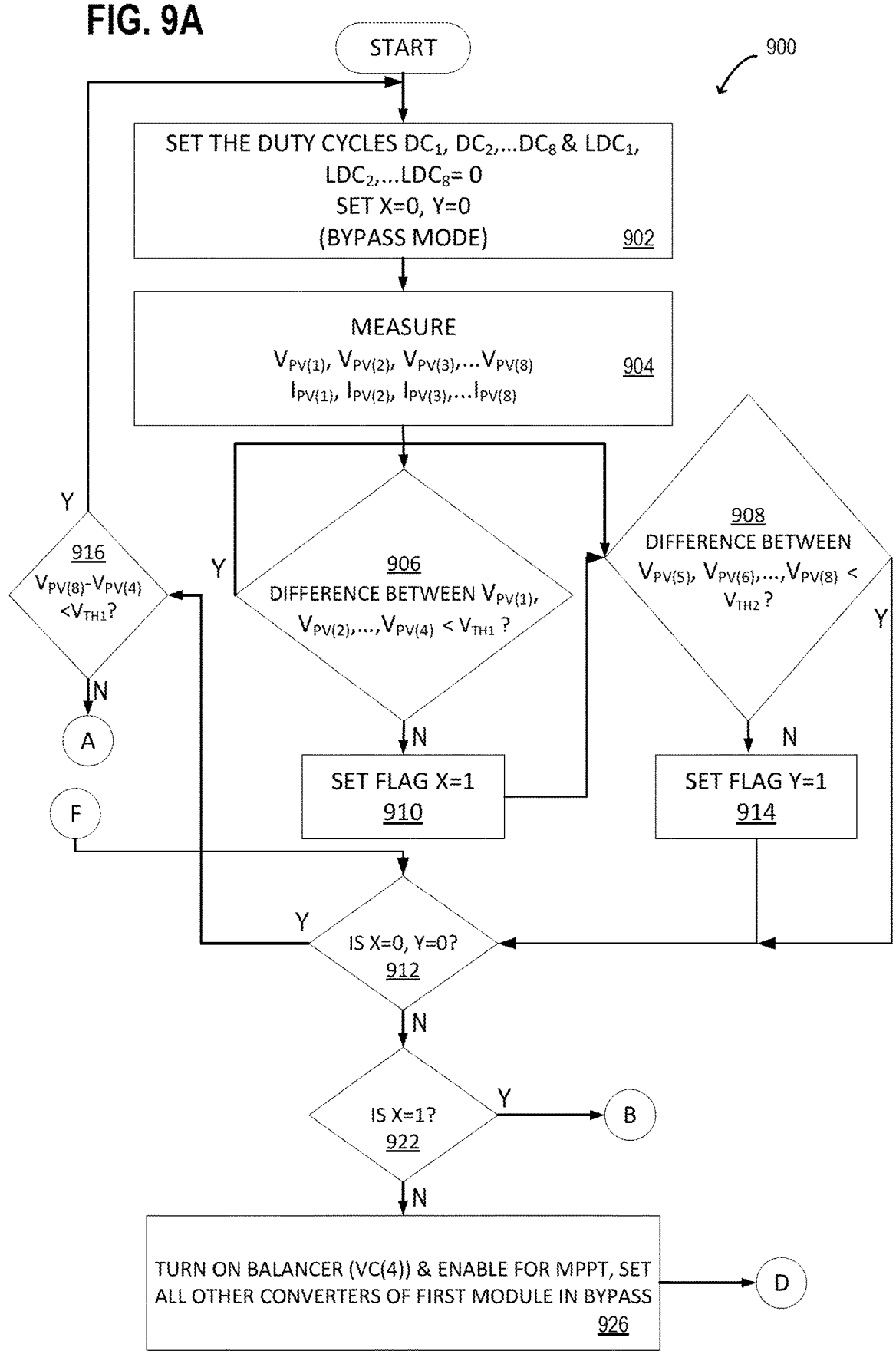
Figure 9C:
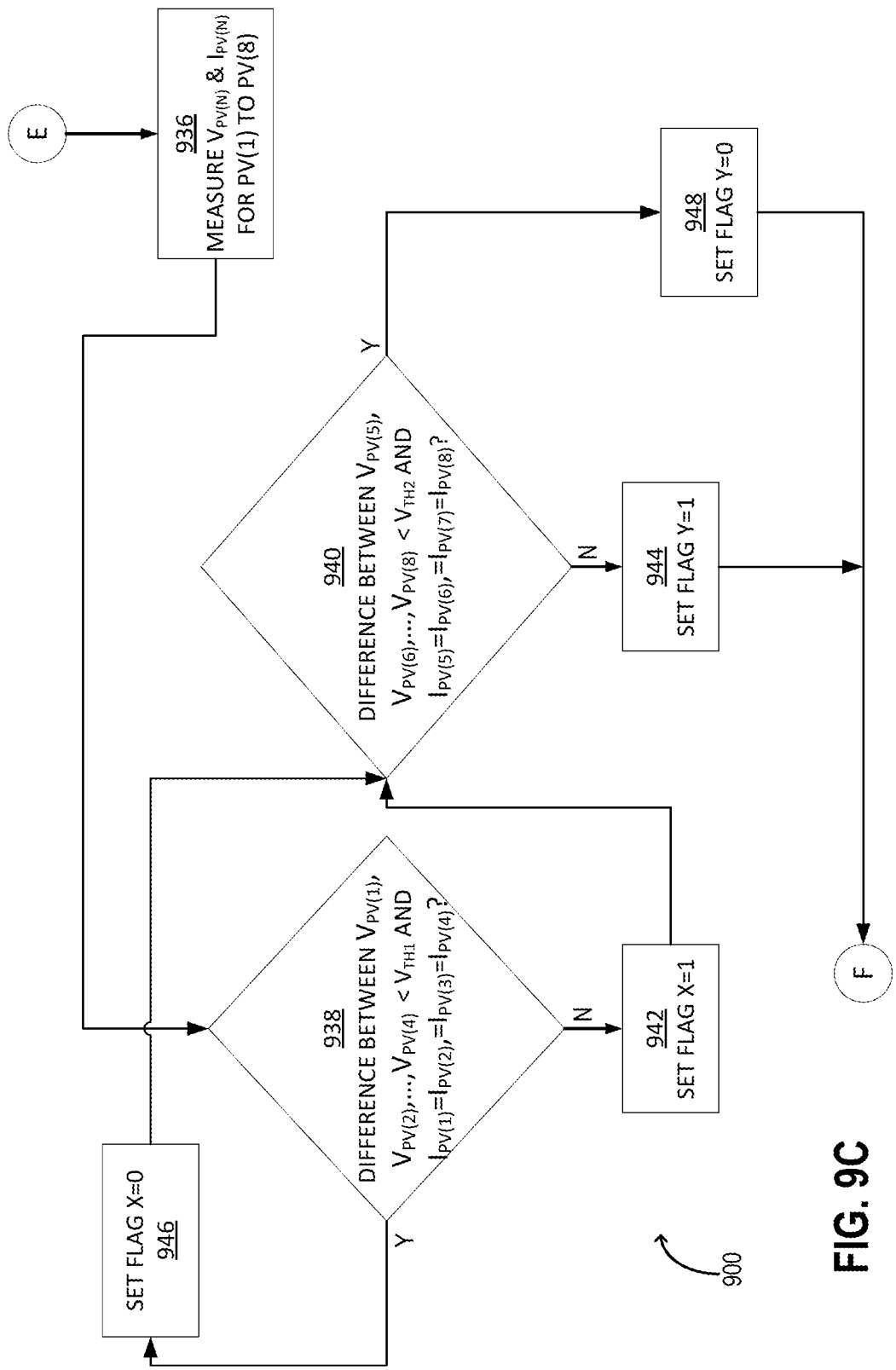

FIGS. 9A-9C show a flow diagram illustrating a method 900 for providing an output power from a series arrangement of direct current (DC) power sources. Method 900 may be enacted on a controller in electrical communication with one or more bidirectional DC-DC voltage converters. While described in the context of the example power conversion system depicted in FIG. 8 comprising a plurality of PV panels 802A-802H and a plurality of bidirectional DC-DC voltage converters 804A-804H arranged in two modules, it will be understood that the method disclosed herein is not limited to this configuration.

In an example power conversion system, a default first duty cycle ($dc_n$) of the first switch Men and a default second duty cycle ($Ldc_n$) of the second switch $M_{2n-1}$ for each balancer (e.g. 804D and 804H in FIG. 8) and for each intermediate bidirectional DC-DC voltage converter (e.g. 804A-804C and 804E-804G in FIG. 8) may be calculated as follows:

$$V_{mp\_M1} = V_{mp1} + V_{mp2} + V_{mp3} + V_{mp4} \quad \text{(equation 1)}$$

where
  $V_{mp\_M1}$ is the sum of individual DC power source voltages at maximum power for the plurality of DC power sources in Module 1;
  $V_{mp1}$=voltage at maximum power point of PV(1);
  $V_{mp2}$=voltage at maximum power point of PV(2);
  $V_{mp3}$=voltage at maximum power point of PV(3); and
  $V_{mp4}$=voltage at maximum power point of PV(4).

$$V_{mp\_M2} = V_{mp5} + V_{mp6} + V_{mp7} + V_{mp8} \quad \text{(equation 2)}$$

where
  $V_{mp\_M2}$ is the sum of individual DC power source voltages at maximum power for the plurality of DC power sources in Module 2;
  $V_{mp5}$=voltage at maximum power point of PV(5);
  $V_{mp6}$=voltage at maximum power point of PV(6);
  $V_{mp7}$=voltage at maximum power point of PV(7); and
  $V_{mp8}$=voltage at maximum power point of PV(8).

$$dc_1 = \frac{V_{mp1}}{V_{mp\_M1}} \quad \text{(equation 3)}$$

$$dc_2 = \frac{(V_{mp1} + V_{mp2})}{V_{mp\_M1}} \quad \text{(equation 4)}$$

$$dc_3 = \frac{(V_{mp1} + V_{mp2} + V_{mp3})}{V_{mp\_M1}} \quad \text{(equation 5)}$$

$$dc_4 = \frac{V_{mp\_M1}}{V_{mp\_M1} + V_{mp\_M2}} \quad \text{(equation 6)}$$

$$dc_5 = \frac{V_{mp5}}{V_{mp\_M2}} \quad \text{(equation 7)}$$

$$dc_6 = \frac{(V_{mp5} + V_{mp6})}{V_{mp\_M2}} \quad \text{(equation 8)}$$

$$dc_7 = \frac{(V_{mp5} + V_{mp6} + V_{mp7})}{V_{mp\_M2}} \quad \text{(equation 9)}$$

$$dc_8 = 0$$

For n=1 to x−1, $$Ldc_n = 1 - dc_n \quad \text{(equation 10)}$$

For n=x, $$Ldc_n = 0 \quad \text{(equation 11)}$$

At 902, method 900 includes setting the first duty cycle and second duty cycle for each intermediate bidirectional DC-DC voltage converter and balancer to zero. When the first duty cycle and second duty cycle of each bidirectional DC-DC voltage converter is set to zero, each bidirectional DC-DC voltage converter is in a bypass mode, such that the plurality of DC power sources PV(n) are connectable directly to a load. Method 902 further includes setting a flag value of a first module to zero (X=0) and a flag value of a second module to zero (Y=0). When both flag values are zero, neither module is balancing a power output, and the series-connected DC power sources are connectable to the load.

At 904, method 900 includes measuring one or more of a voltage and a current at a across each DC power source of the plurality of DC power sources (e.g. 802A-802H). In one example, voltage may be measured at the first terminal of each DC power source PV(n). With reference to the example power conversion system depicted in FIG. 8, the voltage measured at a first terminal of each DC power source (e.g. PV panels 802A-802H) may be represented herein as $V_{PV(1)}$, $V_{PV(2)}$, $V_{PV(3)}$, $V_{PV(4)}$, $V_{PV(5)}$, $V_{PV(6)}$, $V_{PV(7)}$, and $V_{PV(8)}$. In other examples, the current may be measured at either the first terminal of each DC power source PV(n). For the example power conversion system depicted in FIG. 8, the current measured at a first terminal of each DC power source (e.g. PV panels 602A-602H) may be represented as $I_{PV(1)}$, $I_{PV(2)}$, $I_{PV(3)}$, $I_{PV(4)}$, $I_{PV(5)}$, $I_{PV(6)}$, $I_{PV(7)}$, and $I_{PV(8)}$.

At 906, method 900 includes determining whether a difference between each voltage measured at the first terminal of each DC power source in a first module (e.g. PV panels 802A-802D) is less than a threshold voltage $V_{th}$. If the difference between each voltage measured at the first terminal of each DC power source in the first module is determined to be less than the threshold voltage, method 900 includes, at 908, determining whether a difference between each voltage measured at the first terminal of each DC power source in a second module (e.g. PV panels 902E-902H) is less than a threshold voltage $V_{th}$. If the difference between each voltage measured at the first terminal of each DC power source in the second module is determined to be less than the threshold voltage, method 900 includes, at 912, determining whether the flag values for each module are zero (e.g. X=0 and Y=0).

If the difference between each voltage measured at the first terminal of each DC power source in the first module is determined to not be less than the threshold voltage $V_{th}$ in step 906, method 900 includes, at 910, setting the flag value X for the first module equal to 1 (e.g. X=1). If difference between each voltage measured at the first terminal of each DC power source in the second module is determined to not be less than the threshold voltage $V_{th}$ in step 906, method 900 includes, at 914, setting the flag value Y for the first module equal to 1 (e.g. Y=1).

If the flag values for each module are determined to be zero (e.g. X=0 and Y=0) in step 912, method 900 includes, at 916, determining whether the subtraction value of the voltage measured at the first terminal of PV(4) from the voltage measured at the first terminal of PV(8) is less than the threshold voltage. If this subtraction value is less than the threshold voltage, there may be no significant mismatch in current and/or voltage between the plurality of DC power sources, and the bidirectional voltage converters and the intermediate bidirectional voltage converters may be bypassed. When the subtraction value is less than the threshold voltage, method 900 returns to step 902 to continue to monitor for a mismatch in current or voltage between the plurality of DC power sources.

If the subtraction value is determined to not be less than the threshold voltage in step 916, method 900 may comprise, at 918, for each intermediate bidirectional DC-DC voltage converter and balancer, calculating the default first duty cycle ($dc_n$) and the default second duty cycle ($Ldc_n$). At 920, method 900 includes operating the balancer of the first module (e.g. VC(4) in FIG. 8) according to the default first duty cycle (e.g. $dc_4$) and the default second duty cycle (e.g. $Ldc_4$). While operating the bidirectional DC-DC voltage converter of the first module, the intermediate bidirectional DC-DC voltage converters of the first module, and all bidirectional DC-DC voltage converters of the second module are bypassed (e.g. $dc_n = Ldc_n = 0$, for n=1 to 3 and n=5 to 8 in FIG. 8).

If the flag values X and Y are determined to not be zero in step 912, method 900 includes, at 922, determining whether the flag value X is equal to 1. If the flag value X is determined to be equal to 1 in step 922, method 900 includes, at 924, operating all bidirectional DC-DC voltage converters of the first module (e.g. VC(1)-VC(4) in FIG. 8) to perform maximum power point tracking (MPPT). If the flag value X is determined to not be equal to 1 in step 922, method 900 includes, at 926, operating the balancer of the first module (e.g. VC(4) in FIG. 8) to perform MPPT while setting each intermediate bidirectional DC-DC voltage converter of the first module (e.g. VC(1), VC(2), VC(3) in FIG. 8) in bypass mode (e.g. $DC_n = LDC_n = 0$).

At 928, method 900 includes determining whether the flag value Y for the second module is equal to 1. If the flag value Y is determined to equal 1 in step 928, method 900 includes, at 930, operating the balancer of the first module (e.g. VC(4) in FIG. 8) and the intermediate bidirectional DC-DC voltage converters of the second module (e.g. VC(5), VC(6), VC(7) in FIG. 8) to perform MPPT while the bidirectional voltage converter of the second module (e.g. VC(8) in FIG. 8) is bypassed. If the flag value Y is determined to not be equal to 1 in step 928, method 900 includes, at 932, operating the balancer of the first module (e.g. VC(4) in FIG. 8) to perform MPPT while each bidirectional DC-DC voltage converter of the second module is bypassed (e.g. $dc_n$=$Ldc_n$=0 for VC(5), VC(6), VC(7), and VC(8)).

After 920, 930 or 932, method 900 includes, at 934, setting a delay time. In some examples, the delay time may be in the range of microseconds to hundredths of a second. In one example, the delay time is set to 1 second.

After setting the delay time, method 900 includes, at 936, measuring the voltage and the current at the first terminal of each DC power source (e.g. PV panels 802A-802H in FIG. 8). At 938, method 900 includes determining whether a difference between the voltage measured at the first terminal of each DC power source in the first module (e.g. VC(n), n=1 to 4 in FIG. 8) is less than the threshold voltage $V_{th}$. Method 900 further includes, at 938, determining whether the current measured at the first terminal of each DC power source in the first module is equal (e.g. $I_{PV(1)}$=$I_{PV(2)}$=$I_{PV(3)}$=$I_{PV(4)}$). If the difference between the voltage measured at the first terminal of each DC power source in the first module is determined to be less than the threshold voltage and the currents measured are determined to be equal in step 938, method 900 includes, at 946, setting the flag value X for the first module equal to zero (e.g. X=0) and proceeding to step 940. At 940, method 900 includes determining whether a difference between the voltage measured at the first terminal of each DC power source in the second module (e.g. PV panels 802E-802H in FIG. 8) is less than the threshold voltage. Step 940 of method 900 further includes determining whether the currents measured at the first terminal of each DC power source of the second module are equal (e.g. $I_{PV(5)}$=$I_{PV(6)}$=$I_{PV(7)}$=$I_{PV(8)}$).

If the difference between the voltage measured at the first terminal of each DC power source in the first module is determined to not be less than the threshold voltage, method 900 includes, at 942, setting the flag value for the first module equal to 1 (e.g. X=1) and proceeding to step 940, described above. If the difference between the voltage measured at the first terminal of each DC power source in the second module is determined to be less than the threshold voltage, and the current measured at the first terminal of each DC power source of the second module is equal, method 900 includes, at 948, setting the flag value for the second module equal to zero (e.g. Y=0) and returning to step 912. If the difference between the voltage measured at the first terminal of each DC power source in the second module is determined to not be less than the threshold voltage, method 900 includes, at 944, setting the flag value for the second module equal to 1 (e.g. Y=1) and returning to step 912. Accordingly, the example method disclosed herein provides an output power from a plurality of direct current (DC) power sources arranged in two or more modules, such as the modular architecture shown in FIG. 8. It will be understood that this method is not to be limiting in any way, and may be adapted to accommodate power conversion systems including a varying number of modules.

Accordingly, the disclosed systems and methods may be used to balance a mismatch in voltage and/or current between individual DC power sources, such that the systems may optimally extract maximum or near-maximum power from plural interconnected DC power sources. Use of bidirectional DC-DC voltage converters, such as the example bidirectional DC-DC voltage converters disclosed herein, may improve efficiency and lower conversion losses as compared to systems utilizing isolated converters.

Figure 10:
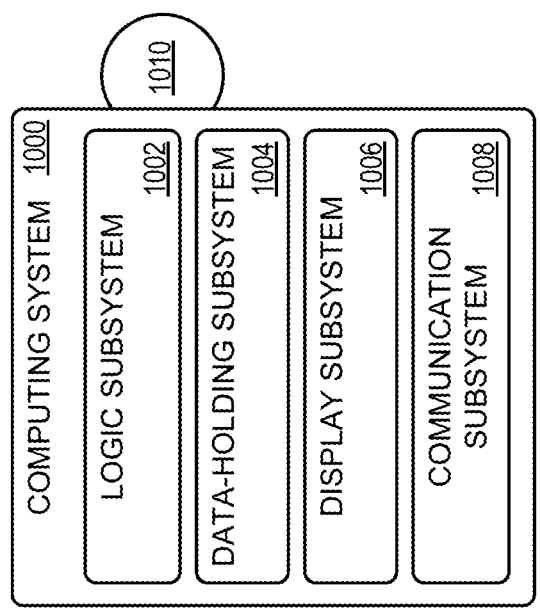
FIG. 10 schematically shows an example computing system.

As described above, the examples disclosed herein may use a controller to enact the disclosed control methods. The controller comprises a computing system, and may take any suitable form and include any suitable hardware and/or software. In some examples, the controller comprises a MCU. FIG. 10 schematically shows an example computing system 1000, which may be used as a controller to perform the methods disclosed herein. In some examples, computing system 1000 may comprise a distributed architecture.

Computing system 1000 includes a logic subsystem 1002 and a data-holding subsystem 1004. Computing system 1000 may optionally include a display subsystem 1006, communication subsystem 1008, and/or other components not shown in FIG. 10. Computing system 1000 may also optionally include user input devices such as keyboards, mice, game controllers, cameras, microphones, and/or touch screens, for example.

Logic subsystem 1002 may include one or more physical devices configured to execute one or more instructions. For example, logic subsystem 1002 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 1002 may include one or more processors that are configured to execute software instructions. Additionally or alternatively, logic subsystem 1002 may include one or more hardware or firmware logic machines configured to execute hardware or firmware instructions. Processors of logic subsystem 1002 may be single core or multicore, and the programs executed thereon may be configured for parallel or distributed processing. Logic subsystem 1002 may optionally include individual components that are distributed throughout two or more devices, which may be remotely located and/or configured for coordinated processing. One or more aspects of logic subsystem 1002 may be virtualized and executed by remotely accessible networked computing devices configured in a cloud computing configuration.

Data-holding subsystem 1004 may include one or more physical, non-transitory, devices configured to hold data and/or instructions executable by logic subsystem 1002 to implement the herein described methods and processes. When such methods and processes are implemented, the state of data-holding subsystem 1004 may be transformed (e.g., to hold different data).

Data-holding subsystem 1004 may include removable media and/or built-in devices. Data-holding subsystem 1004 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 1004 may include devices with one or more of the following characteristics: volatile, nonvolatile, dynamic, static, read/write, read-only, random access, sequential access, location addressable, file addressable, and content addressable. In some embodiments, logic subsystem 1002 and data-holding subsystem 1004 may be integrated into one or more common devices, such as an application specific integrated circuit or a system on a chip.

FIG. 10 also shows an aspect of the data-holding subsystem in the form of removable computer-readable storage media 1010, which may be used to store and/or transfer data and/or instructions executable to implement the herein described methods and processes. Removable computer-readable storage media 1010 may take the form of CDs, DVDs, HD-DVDs, Blu-Ray Discs, EEPROMs, and/or floppy disks, among others.

It is to be appreciated that data-holding subsystem 1004 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 1006 may be used to present a visual representation of data held by data-holding subsystem 1004. As the herein described methods and processes change the data held by the data-holding subsystem, and thus transform the state of the data-holding subsystem, the state of display subsystem 1006 may likewise be transformed to visually represent changes in the underlying data. Display subsystem 1006 may include one or more display devices utilizing virtually any type of technology. Such display devices may be combined with logic subsystem 1002 and/or data-holding subsystem 1004 in a shared enclosure, or such display devices may be peripheral display devices.

When included, communication subsystem 1008 may be configured to communicatively couple computing system 1000 with one or more other computing devices. Communication subsystem 1008 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 1000 to send and/or receive messages to and/or from other devices via a network such as the Internet.

Another example provides a power conversion system configured to provide a power output from a series arrangement of direct current (DC) power sources, the power conversion system comprising a plurality of DC power sources connected in a series PV(n), n=1 to x, for each power source PV(n) for n=1 to x−1, an intermediate bidirectional voltage converter VC(n) connected to a first terminal of the power source PV(n), the intermediate bidirectional voltage converter VC(n) also connected to a first terminal of power source PV(x) and to a second terminal of power source PV(1), the intermediate bidirectional voltage converter VC(n) comprising a first switch operable in a pulsed mode to boost a power output by power source PV(n) and a second switch operable in a pulsed mode to reduce a power output by power source PV(n) to thereby stabilize power output at the first terminal of power source PV(x), and a balancer VC(x) connectable to the first terminal of PV(x) and to a load. In such examples, the power conversion system may additionally or alternatively comprise a sensor configured to measure one or more of voltage and current at the first terminal of each power source PV(n). In such examples, the power conversion system may additionally or alternatively comprise a controller configured to, for each intermediate bidirectional voltage converter VC(n), operate the first switch and the second switch in response to the one or more of voltage and current measured at the first terminal of the power source PV(n). In such examples, the controller may additionally or alternatively be configured to bypass one or more of the intermediate bidirectional voltage converters VC(n) and the balancer VC(x) when a difference between each voltage measured at the first terminal of each power source PV(n) is less than a threshold voltage. In such examples, for each intermediate bidirectional voltage converter VC(n) and the balancer VC(x), the controller may additionally or alternatively be configured to pulse the first switch according to a first duty cycle and the second switch according to a second duty cycle. In such examples, the balancer VC(x) may additionally or alternatively be configured to boost a combined output voltage of the plurality of DC power sources PV(n), n=1 to x based upon the load. In such examples, each power source PV(n) may additionally or alternatively comprise one or more of a solar cell, a solar panel, a lithium ion cell, a lead acid cell, a battery, a super-capacitor, and a fuel cell. In such examples, one or more of the first switching device and the second switching device may additionally or alternatively comprise a MOSFET, an insulated gate bipolar transistor (IGBT), a field-effect transistor, a bipolar junction transistor, a thyristor, a gate-controlled thyristor, and a silicon-controlled rectifier. In such examples, wherein the plurality of DC power sources PV(n), n=1 to x is a first plurality of DC power sources and the balancer VC(x) is a first balancer, the power conversion system may additionally or alternatively comprise a second plurality of DC power sources PV(n), n=x+1 to 2x connected in a series with the first plurality of DC power sources, for each power source PV(n) from x+1 to 2x−1, an intermediate bidirectional voltage converter VC(n) connected to a first terminal of the power source PV(n), the intermediate bidirectional voltage converter VC(n) also connected to a first terminal of power source PV(2x) and to a second terminal of power source PV(x+1), the intermediate bidirectional voltage converter VC(n) comprising a first switch operable in a pulsed mode to boost a power output at power source PV(n) and a second switch operable in a pulsed mode to reduce a power output at the first terminal of PV(n) to thereby stabilize power output at a first terminal of power source PV(2x), and a second balancer VC(2x) connectable to the first terminal of power source PV(2x) and to the load. In such examples, each of the first balancer VC(x) and the second balancer VC(2x) may additionally or alternatively comprise a higher power rating than the intermediate bidirectional voltage converters VC(n), n=1 to x−1, x+1 to 2x−1.

Another example provides a power supply system comprising a plurality of direct current (DC) power sources, each DC power source comprising a first terminal connected to a corresponding packet generator to provide power to the corresponding packet generator, each packet generator comprising an energy storage component, a switching component operable in a pulsed mode to boost a power output at the DC power source, a rectifying component, and an output connected to a common conductor, an energy combiner connected between the common conductor and a second terminal of each DC power source, and a pair of output terminals connectable to a load, the pair of output terminals arranged in parallel with the energy combiner. In such examples, the energy storage component may additionally or alternatively comprise one or more of a capacitor and an inductor. In such examples, the switching component may additionally or alternatively comprise one or more of an insulated gate bipolar transistor (IGBT), a MOSFET, a field-effect transistor, a bipolar junction transistor, a thyristor, a gate-controlled thyristor, and a silicon-controlled rectifier. In such examples, the rectifying component may additionally or alternatively comprise a diode. In such examples, the energy combiner may additionally or alternatively comprise a capacitor configured to combine energy packets generated by each energy packet generator, the energy packet combiner configured to supply a combined output of energy packets to the load. In such examples, one or more DC power sources may additionally or alternatively be directly connected to the load while one or more energy packet generators generate an energy packet from one or more DC power sources. In such examples, the power supply system may additionally or alternatively comprise a controller in electrical communication with the energy packet combiner and each energy packet generator, the controller configured to control the generation of electrical energy packets.

Another example provides, enacted on a controller, a method for controlling a power output in a power conversion system, the power conversion system comprising a plurality of direct current (DC) power sources connected in a series PV(n), n=1 to x, for each DC power source PV(n) from 1 to x−1, an intermediate bidirectional voltage converter VC(n) comprising a first switch operable in a pulsed mode to boost a power output by power source PV(n) and a second switch operable in a pulsed mode to reduce a power output by power source PV(n), and a balancer VC(x) connected to a load, the method comprising measuring a voltage across each DC power source PV(n), comparing the voltage measured for each DC power source PV(n) to the voltage measured for one or more other DC power sources PV(n), when the voltage across each power source PV(n) is determined to be within a threshold voltage difference compared to the voltage across each other power source PV(n), bypassing the intermediate bidirectional voltage converters VC(n), and when the voltage across a selected power source PV(n) is determined to meet or exceed the threshold voltage difference compared to the voltage across a selected other power source PV(n), determining for one or more intermediate bidirectional voltage converters VC(n) a first duty cycle of the first switch and a second duty cycle of the second switch, operating the first switch according to the first duty cycle, and operating the second switch according to the second duty cycle. In such examples, the method may additionally or alternatively comprise measuring a current at the first terminal of each DC power source PV(n), and operating the first switch and the second switch of a selected bidirectional voltage converter based on the current measured. In such examples, determining the first duty cycle and the second duty cycle may additionally or alternatively comprise, for each intermediate bidirectional voltage converter VC(n), determining each duty cycle based at least in part on an impedance of a corresponding power source PV(n).

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A power conversion system configured to provide a power output from a series arrangement of direct current (DC) power sources, the power conversion system comprising:
a first plurality of DC power sources PV(n), n=1 to x;
for each power source PV(n) for n=1 to x−1 of the first plurality of DC power sources,
an intermediate bidirectional voltage converter VC(n) connected directly by a conductor to a first terminal of the power source PV(n) of the first plurality of DC power sources, the intermediate bidirectional voltage converter VC(n) also connected directly by a conductor to a first terminal of power source PV(x) of the first plurality of DC power sources and to a second terminal of power source PV(1) of the first plurality of DC power sources, the intermediate bidirectional voltage converter VC(n) comprising a first switch operable in a pulsed mode to boost a power output by power source PV(n) of the first plurality of DC power sources and a second switch operable in a pulsed mode to reduce a power output by power source PV(n) of the first plurality of DC power sources to thereby stabilize power output at the first terminal of power source PV(x) of the first plurality of DC power sources;
a first balancer VC(x) connectable to the first terminal of PV(x) of the first plurality of DC power sources; and
a second plurality of DC power sources PV(n), n=x+1 to 2x connected in a series with the first plurality of DC power sources, the power conversion system comprising, for each power source PV(n) of the second plurality of DC power sources from x+1 to 2x−1,
an intermediate bidirectional voltage converter VC(n) connected directly by a conductor to a first terminal of the power source PV(n) of the second plurality of DC power sources, the intermediate bidirectional voltage converter VC(n) also connected directly by a conductor to a first terminal of power source PV(2x) of the second plurality of DC power sources and to a second terminal of power source PV(x+1) of the second plurality of DC power sources, the intermediate bidirectional voltage converter VC(n) comprising a first switch operable in a pulsed mode to boost a power output at power source PV(n) of the second plurality of power sources and a second switch operable in a pulsed mode to reduce a power output at the first terminal of PV(n) of the second plurality of power sources to thereby stabilize power output at a first terminal of power source PV(2x) of the second plurality of power sources; and
a second balancer VC(2x) connectable to the first terminal of power source PV(2x) of the second plurality of DC power sources and to a load.

2. The power conversion system of claim 1, wherein each of the first balancer VC(x) and the second balancer VC(2x) comprises a higher power rating than the intermediate bidirectional voltage converters VC(n), n=1 to x−1, x+1 to 2x−1.

3. The power conversion system of claim 1, further comprising a sensor configured to measure one or more of voltage and current at the first terminal of each power source PV(n) of the first plurality of DC power sources and each power source PV(n) of the second plurality of DC power sources.

4. The power conversion system of claim 3, further comprising a controller configured to, for each intermediate bidirectional voltage converter VC(n) of the first plurality of DC power sources, operate the first switch and the second switch in response to the one or more of voltage and current measured at the first terminal of the power source PV(n) of the first plurality of DC power sources, and configured to, for each intermediate bidirectional voltage converter VC(n) of the second plurality of DC power sources, operate the first switch and the second switch in response to the one or more voltage and current measured at the first terminal of the power source PV(n) of the second plurality of DC power sources.

5. The power conversion system of claim 4, wherein the controller is configured to bypass one or more of the intermediate bidirectional voltage converters VC(n) of the first plurality of DC power sources and the first balancer VC(x) when a difference between each voltage measured at the first terminal of each power source PV(n) of the first plurality of DC power sources is less than a threshold voltage, and configured to bypass one or more of the intermediate bidirectional voltage converters VC(n) of the second plurality of DC power sources and the second balancer VC(2x) when a difference between each voltage measured at the first terminal of each power source PV(n) of the second plurality of DC power sources is less than the threshold voltage.

6. The power conversion system of claim 4, wherein, for each intermediate bidirectional voltage converter VC(n) of the first plurality of DC power sources, the first balancer VC(x), each intermediate bidirectional voltage converter VC(n) of the second plurality of DC power sources, and the second balancer VC(2x), the controller is configured to pulse the first switch according to a first duty cycle and the second switch according to a second duty cycle.

7. The power conversion system of claim 1, wherein the first balancer VC(x) and the second balancer VC(2x) are configured to boost a combined output voltage of the first plurality of DC power sources PV(n), n=1 to x and the second plurality of DC power sources PV(n), n=x+1 to 2x based upon the load.

8. The power conversion system of claim 1, wherein each power source PV(n) of the first plurality of DC power sources and each power source PV(n) of the second plurality of DC power sources comprises one or more of a solar cell, a solar panel, a lithium ion cell, a lead acid cell, a battery, a super-capacitor, and a fuel cell.

9. The power conversion system of claim 1, wherein one or more of the first switching device and the second switching device comprises a MOSFET, an insulated gate bipolar transistor (IGBT), a field-effect transistor, a bipolar junction transistor, a thyristor, a gate-controlled thyristor, and a silicon-controlled rectifier.

\* \* \* \* \*